United States Patent
Kim et al.

(10) Patent No.: US 12,108,153 B2
(45) Date of Patent: Oct. 1, 2024

(54) CAMERA ACTUATOR AND CAMERA DEVICE COMPRISING SAME

(71) Applicant: LG INNOTEK CO., LTD., Seoul (KR)

(72) Inventors: Min Ook Kim, Seoul (KR); Kyung Won Kim, Seoul (KR); Kyung Sung Chu, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 70 days.

(21) Appl. No.: 17/926,382

(22) PCT Filed: May 18, 2021

(86) PCT No.: PCT/KR2021/006224
§ 371 (c)(1),
(2) Date: Nov. 18, 2022

(87) PCT Pub. No.: WO2021/235834
PCT Pub. Date: Nov. 25, 2021

(65) Prior Publication Data
US 2023/0188850 A1    Jun. 15, 2023

(30) Foreign Application Priority Data

May 19, 2020   (KR) .................. 10-2020-0059768

(51) Int. Cl.
*H04N 23/68*   (2023.01)
*H04N 23/55*   (2023.01)

(52) U.S. Cl.
CPC .......... *H04N 23/687* (2023.01); *H04N 23/55* (2023.01)

(58) Field of Classification Search
CPC ...... H04N 23/687; H04N 23/55; H04N 23/57; H04N 23/58; G03B 3/10; G03B 17/17;
(Continued)

(56) References Cited

U.S. PATENT DOCUMENTS 11,487,322 B2 *  11/2022  Kuna ................... G06F 1/1656
11,982,796 B2 *   5/2024  Shabtay ................ H04N 23/90
(Continued)

FOREIGN PATENT DOCUMENTS

EP        1 134 970 A1     9/2001
JP      2009-526257 A      7/2009
(Continued)

*Primary Examiner* — Hung H Lam
(74) *Attorney, Agent, or Firm* — Birch, Stewart, Kolasch & Birch, LLP

(57) ABSTRACT

An embodiment of the present invention provides a camera actuator comprising: a holder disposed in a lower part; a rotation part disposed inside the holder, an optical member disposed on the rotation part; a first drive part for tilting the optical member to a first axis by pressing the rotation part; and a second drive part for tilting the optical member to a second axis by pressing the rotation part, wherein the rotation part comprises: a first rotation plate disposed on the inside; a second rotation plate disposed outside the first rotation plate; a fixing plate disposed outside the second rotation plate; a first bridge disposed between the first rotation plate and the second rotation plate so as to be positioned corresponding to the first axis; and a second bridge disposed between the second rotation plate and the fixing plate so as to be positioned corresponding to the second axis.

10 Claims, 19 Drawing Sheets

(58) Field of Classification Search
CPC ............ G03B 30/00; G03B 2205/0007; G03B 2205/0061; G03B 2205/0069; G03B 5/06; G03B 5/00; G03B 13/36
See application file for complete search history.

(56) References Cited

U.S. PATENT DOCUMENTS

| | | |
|---|---|---|
| 2005/0225646 A1* | 10/2005 | Shintani ................ G03B 5/00 348/208.99 |
| 2009/0122406 A1 | 5/2009 | Rouvinen et al. |
| 2016/0180534 A1* | 6/2016 | Ernst ................ H04N 5/2628 348/294 |
| 2018/0231793 A1 | 8/2018 | Jeong et al. |
| 2019/0104239 A1 | 4/2019 | Aschwanden et al. |
| 2020/0073140 A1 | 3/2020 | Eddington et al. |
| 2020/0221026 A1* | 7/2020 | Fridman ............... H04N 23/55 |
| 2020/0257132 A1* | 8/2020 | Im ........................ G02B 7/08 |
| 2020/0363614 A1* | 11/2020 | Kwon ................... G03B 5/00 |
| 2021/0333521 A9* | 10/2021 | Yedid ................... G01D 5/145 |

FOREIGN PATENT DOCUMENTS

| | | |
|---|---|---|
| JP | 2015-92285 A | 5/2015 |
| KR | 10-2012-0042386 A | 5/2012 |
| KR | 10-2018-0094355 A | 8/2018 |
| KR | 10-2018-0097228 A | 8/2018 |
| KR | 10-2019-0129798 A | 11/2019 |

* cited by examiner

[FIG.1]
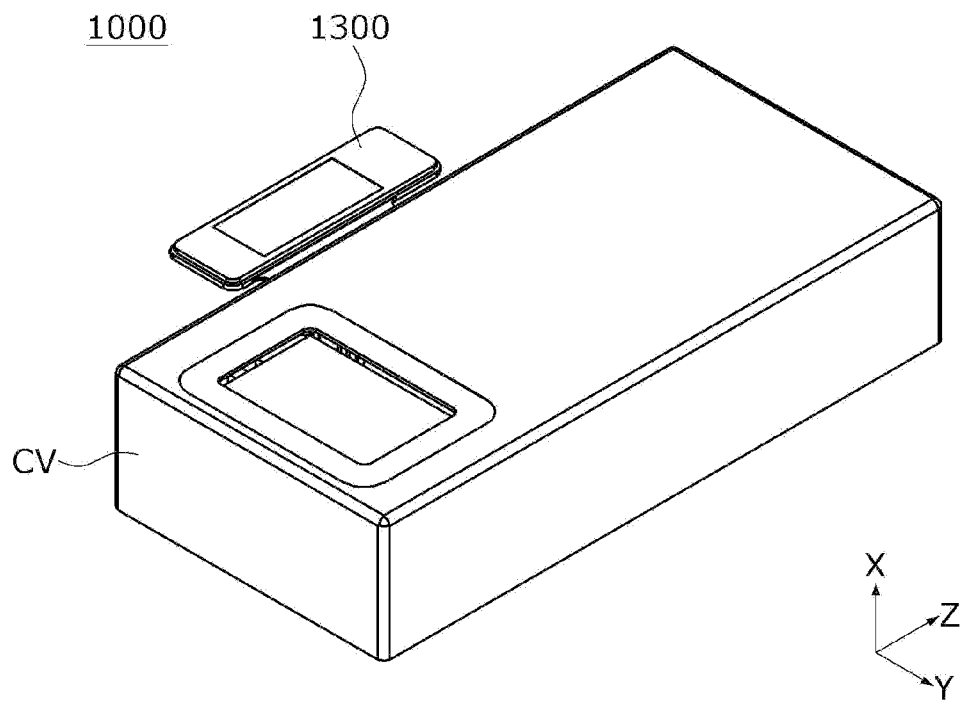
[FIG.2]
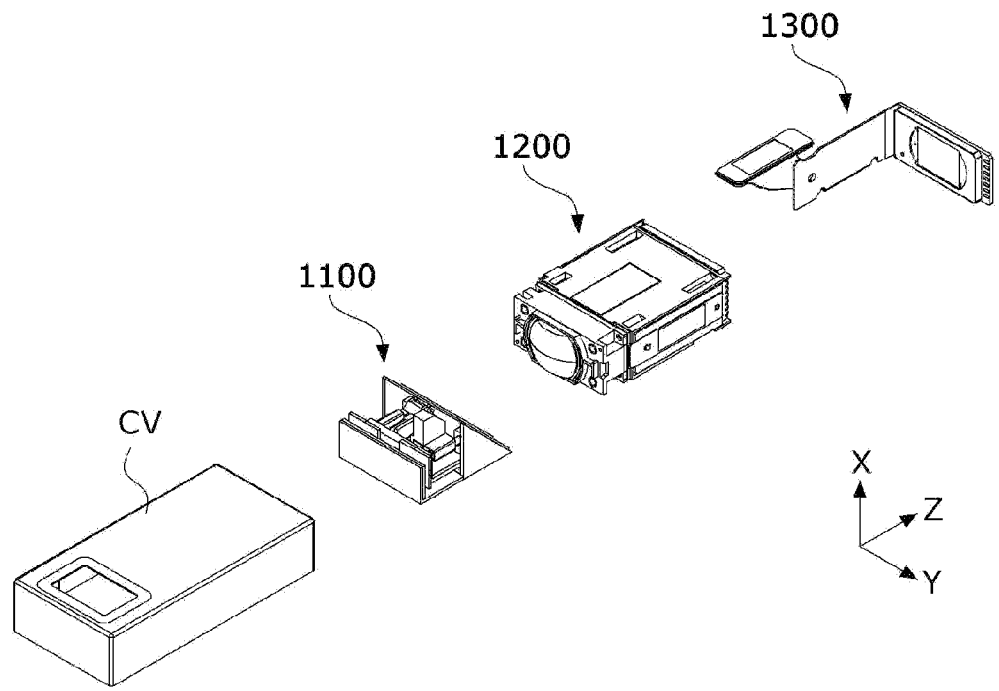

[FIG.3]
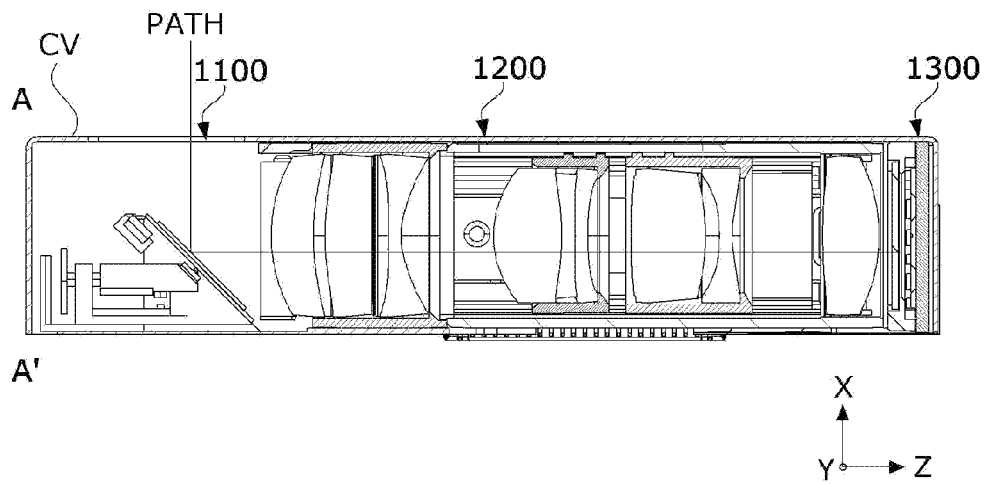
[FIG.4]
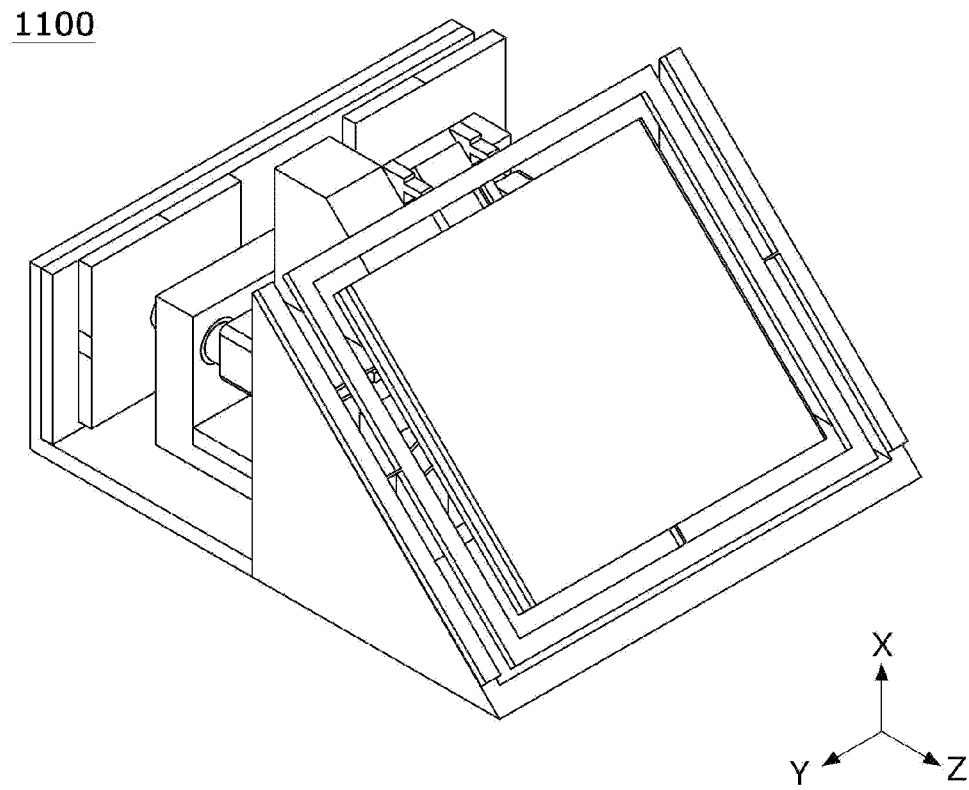

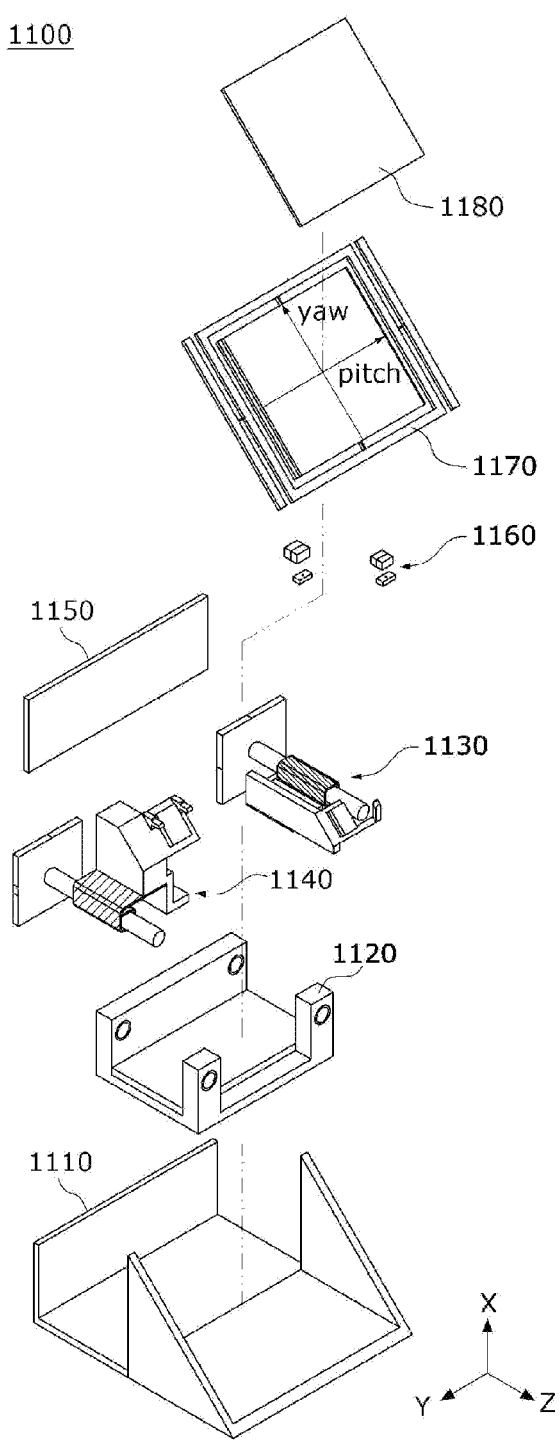

[FIG.6]
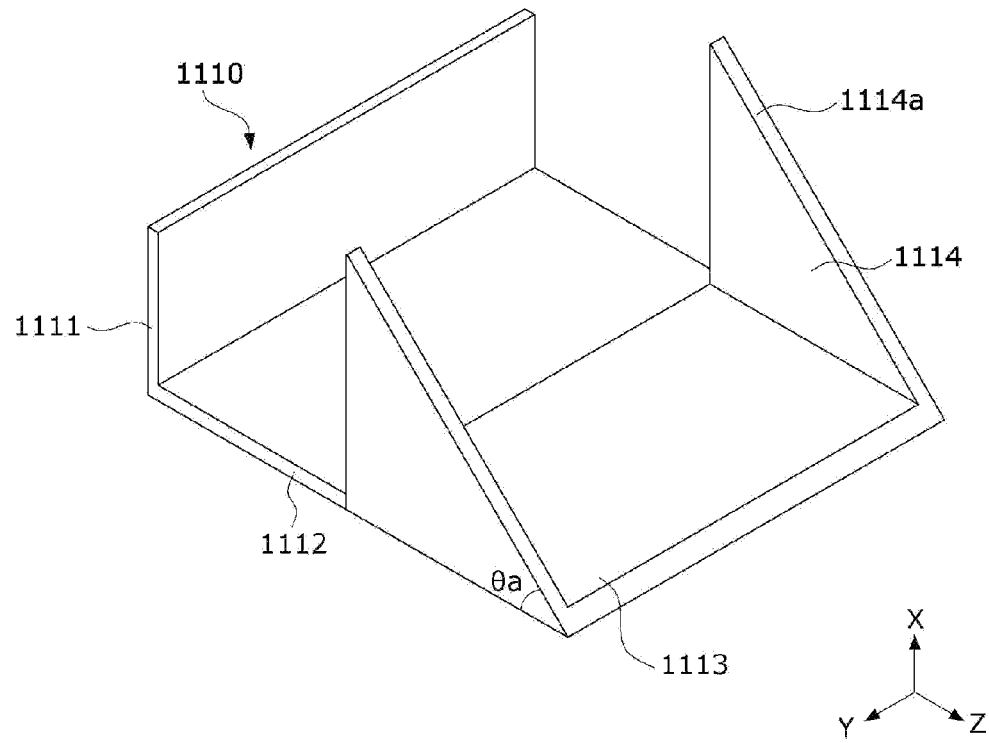
[FIG.7]
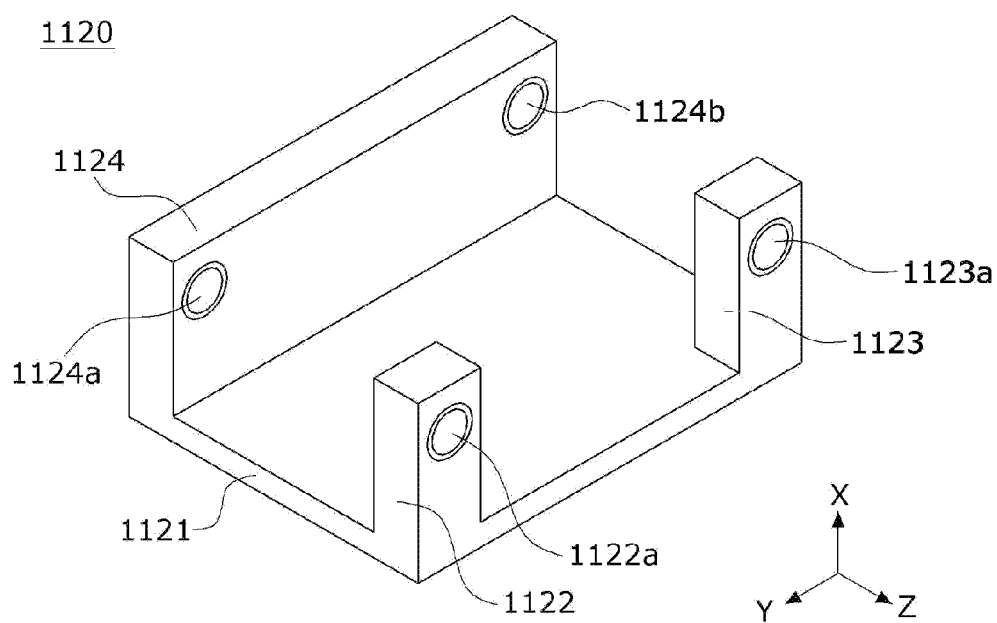

[FIG.8a]
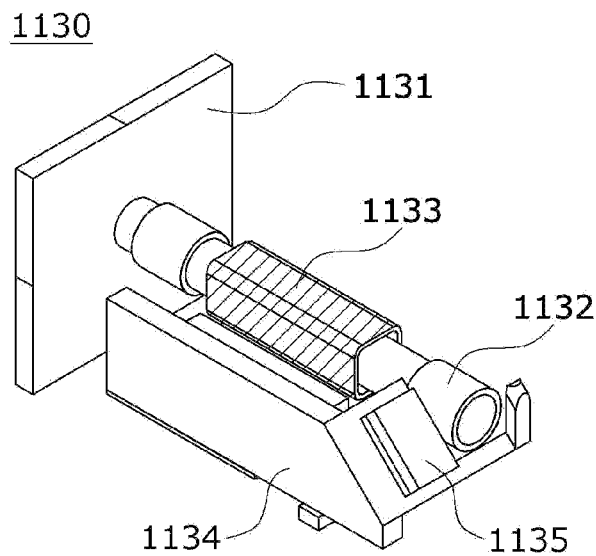
[FIG.8b]
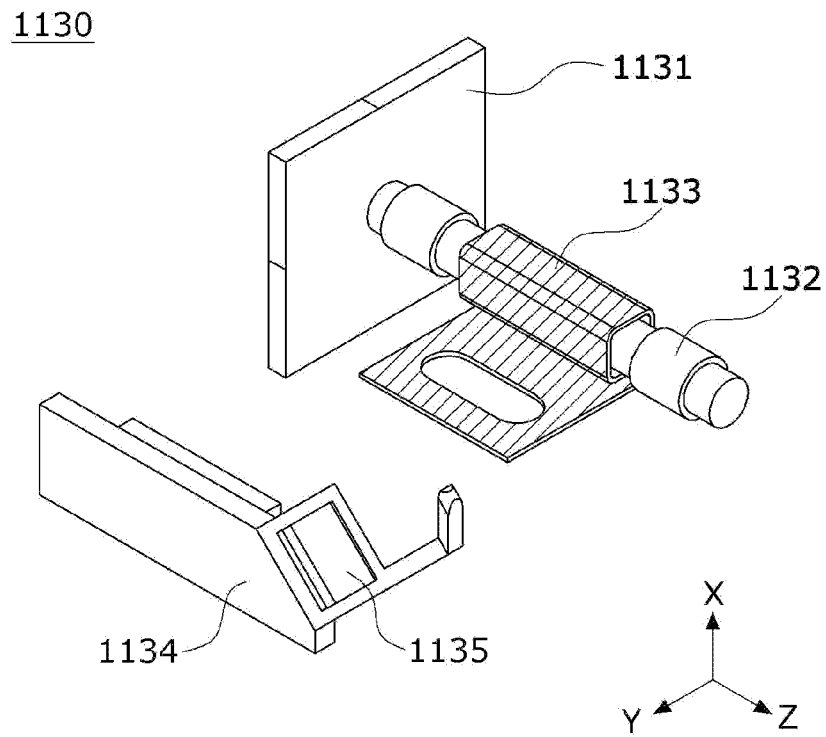

[FIG.8c]
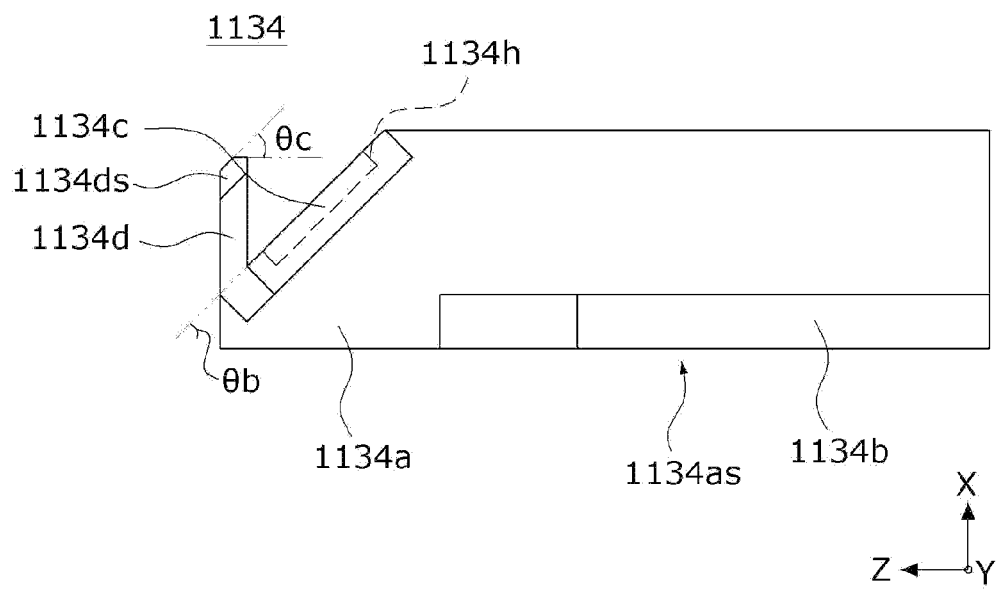
[FIG.9a]
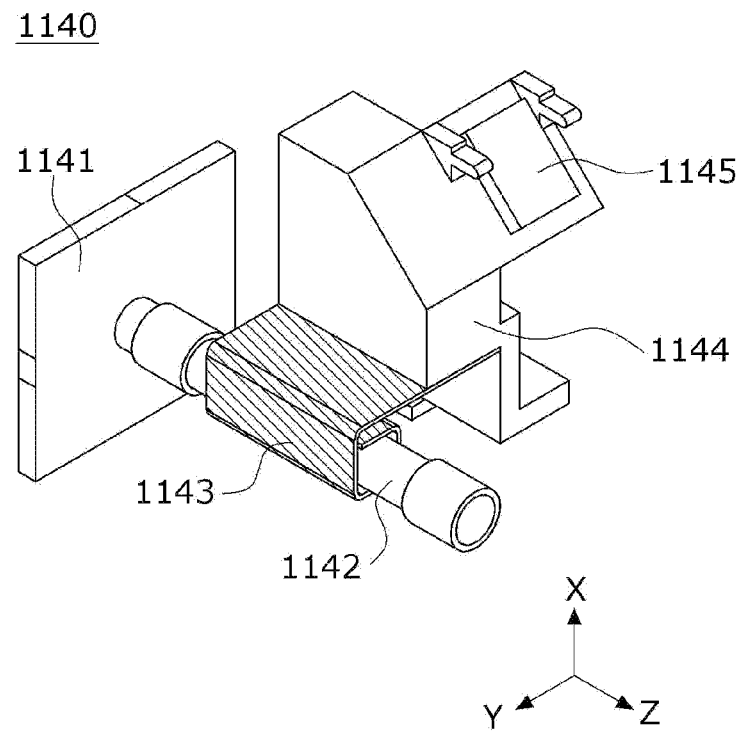

【FIG.9b】
1140
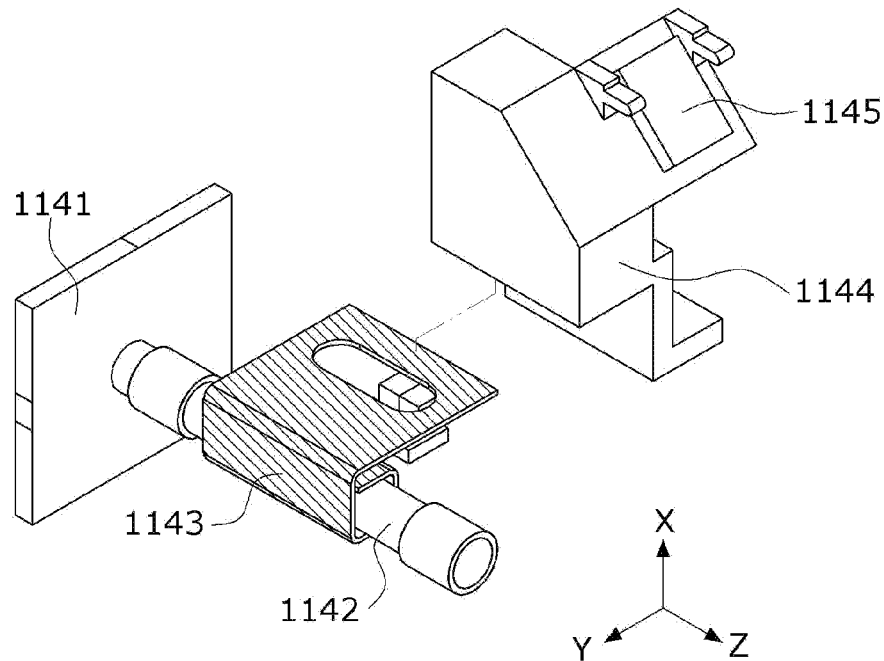
【FIG.9c】
1144
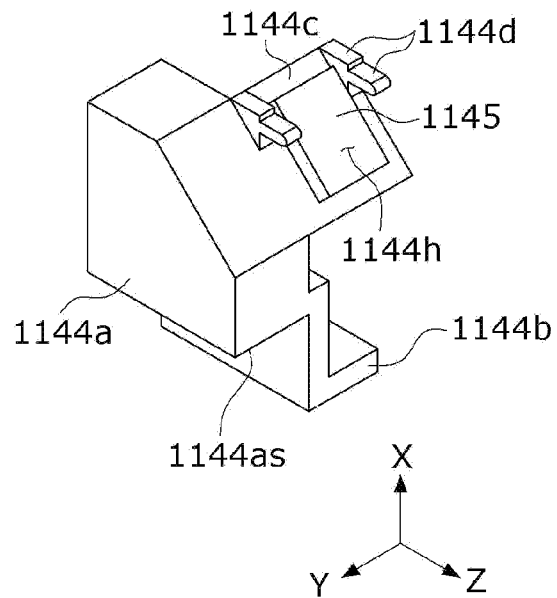

[FIG.9d]
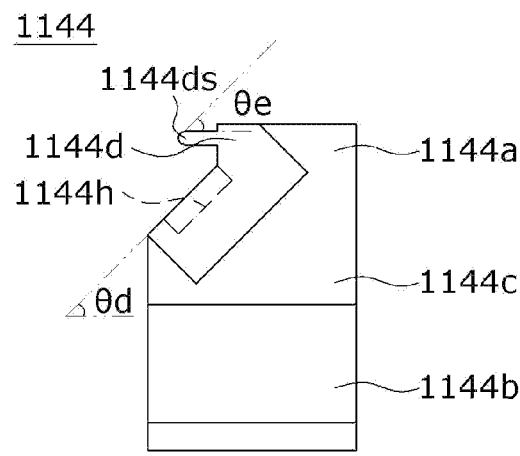
[FIG.10]
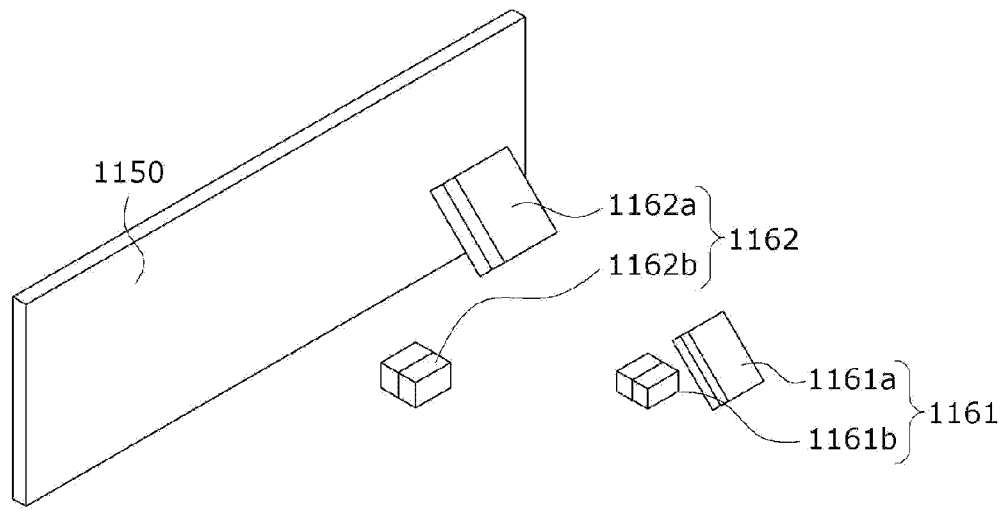

[FIG.11]
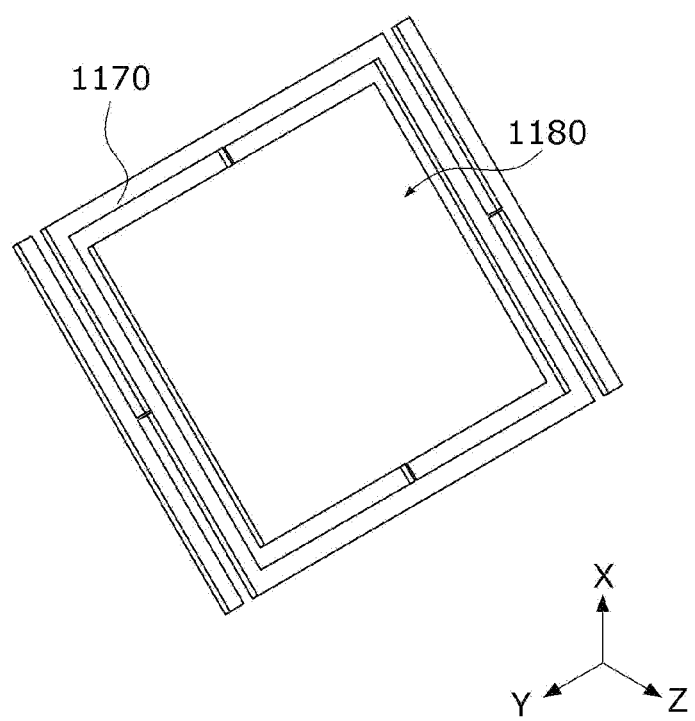

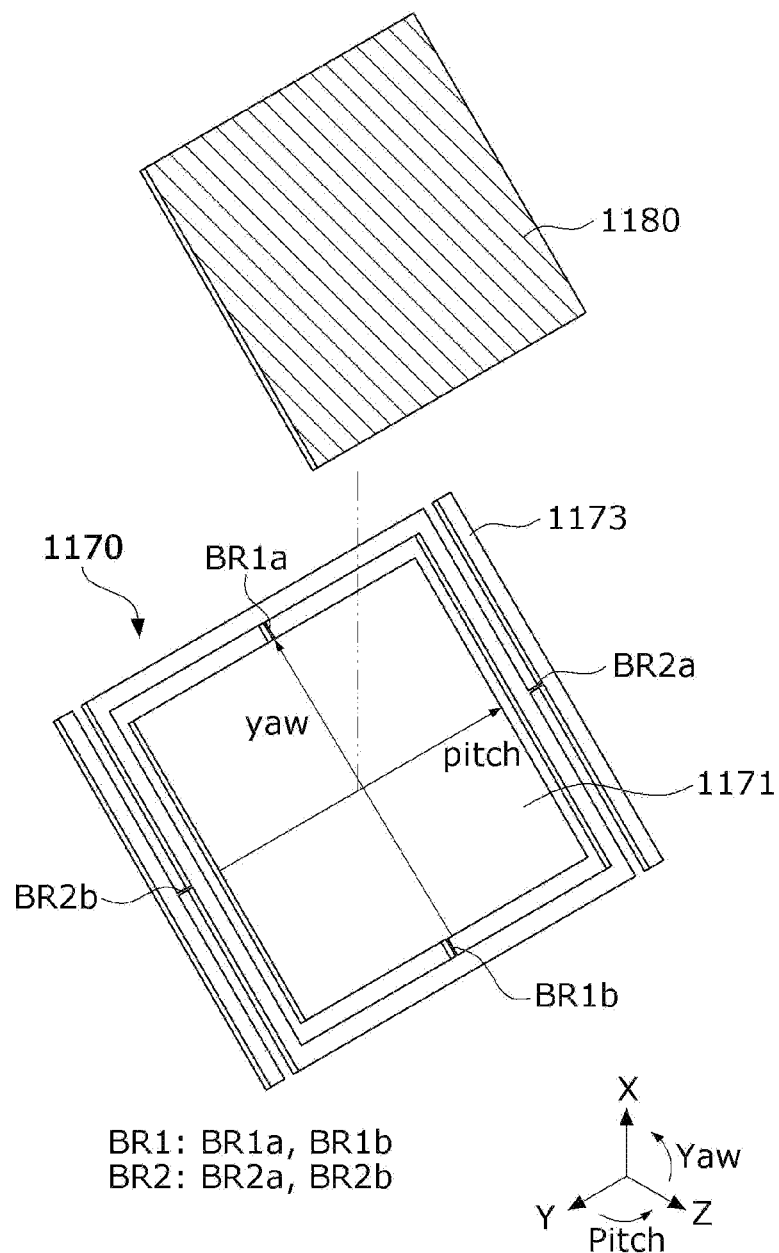

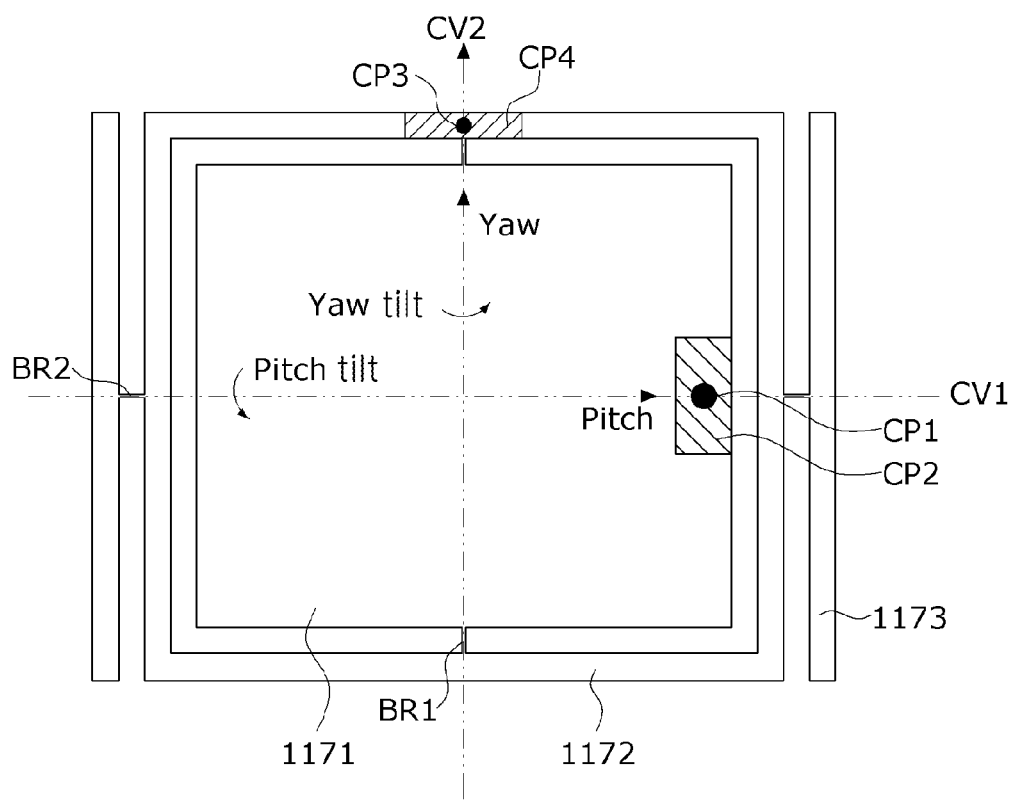
[FIG.13]

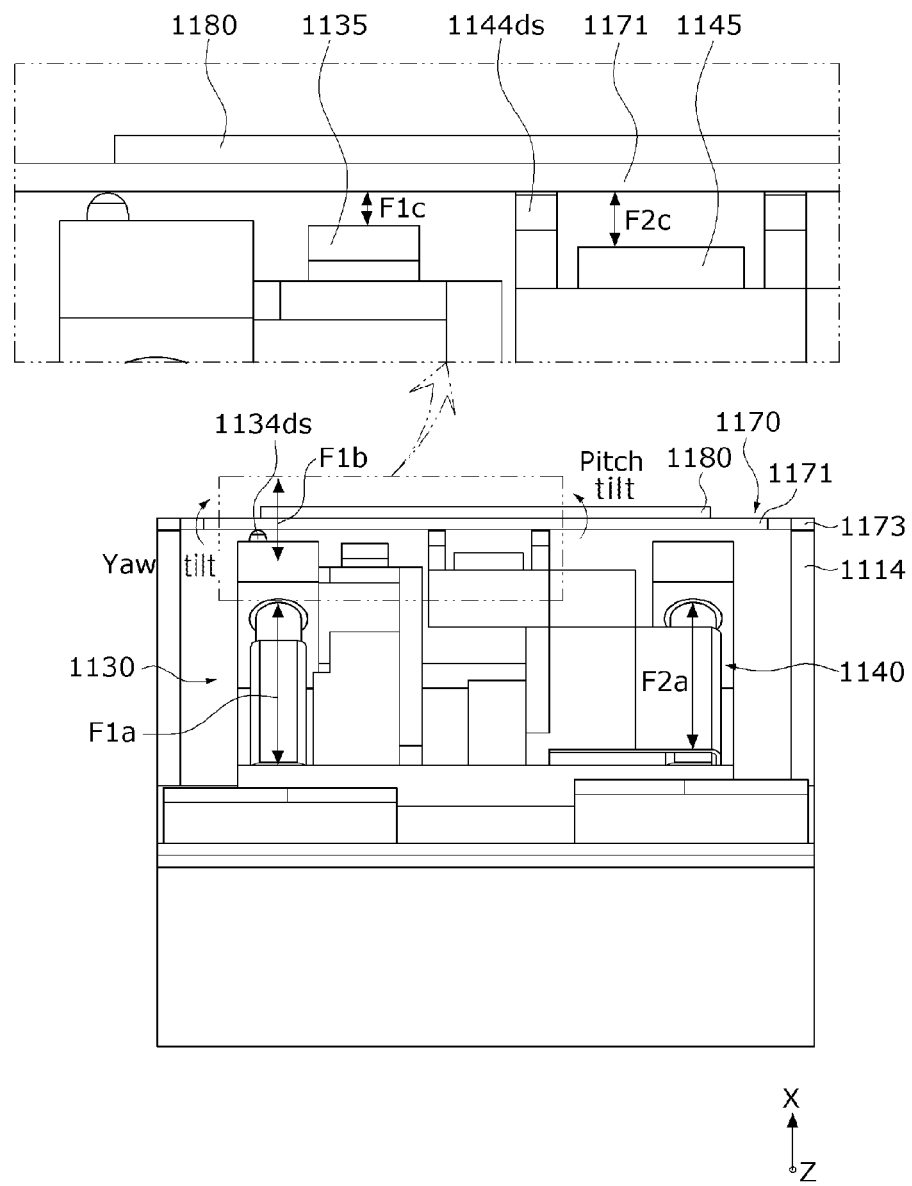
[FIG.14]

[FIG.15]
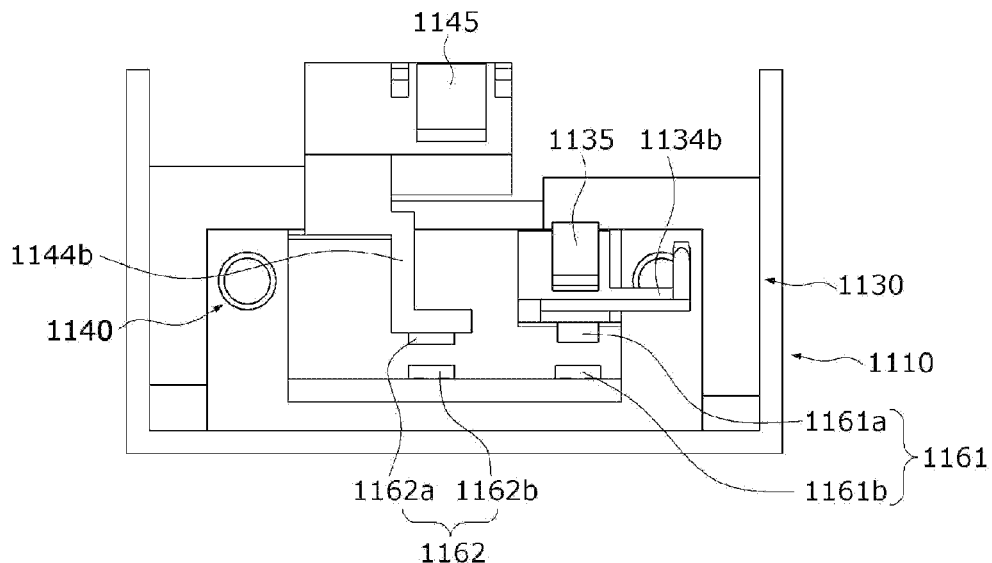
[FIG.16a]
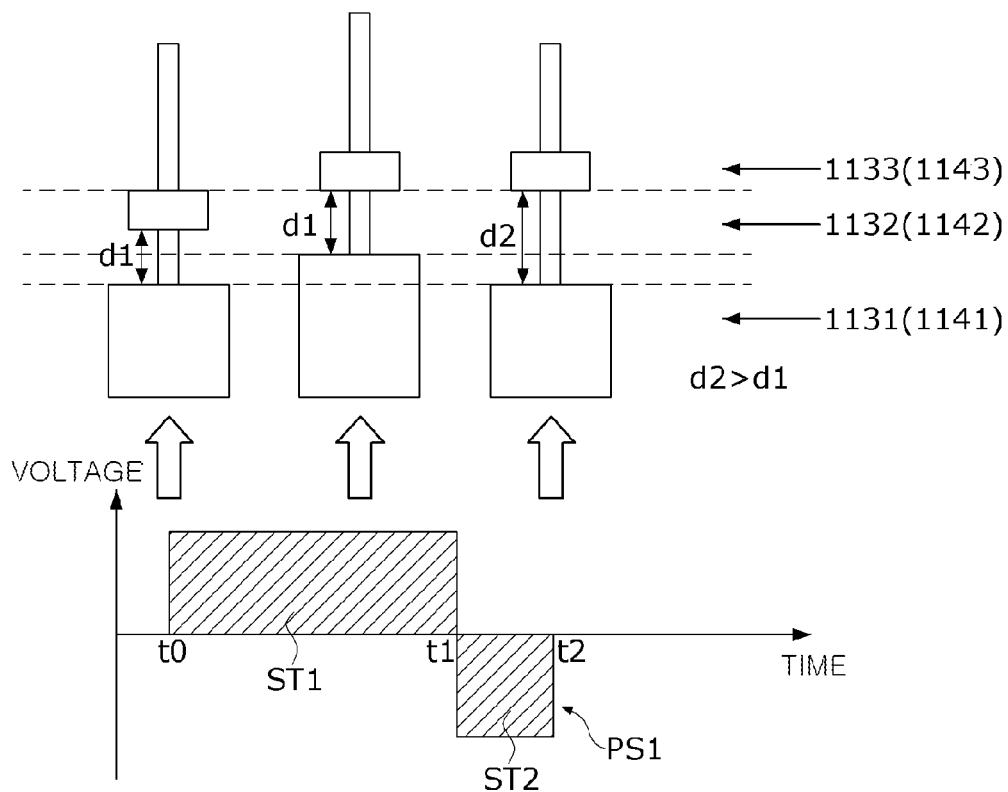

【FIG.16b】
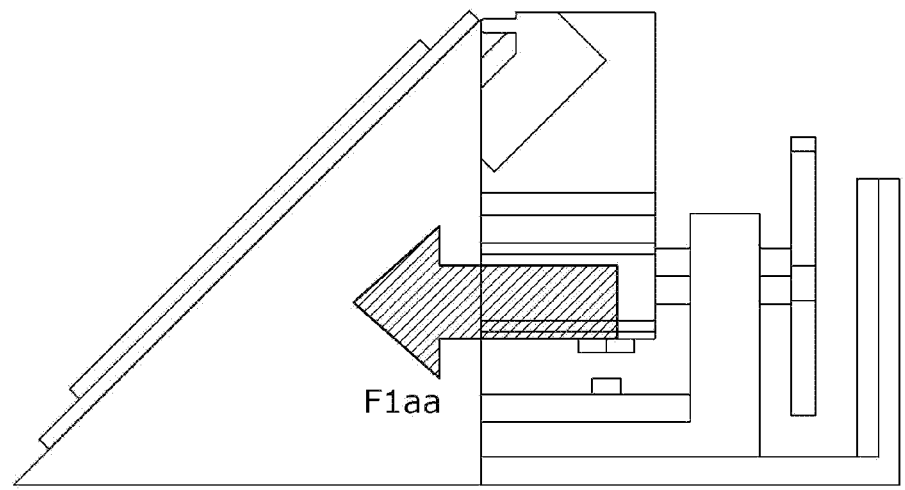
【FIG.17a】
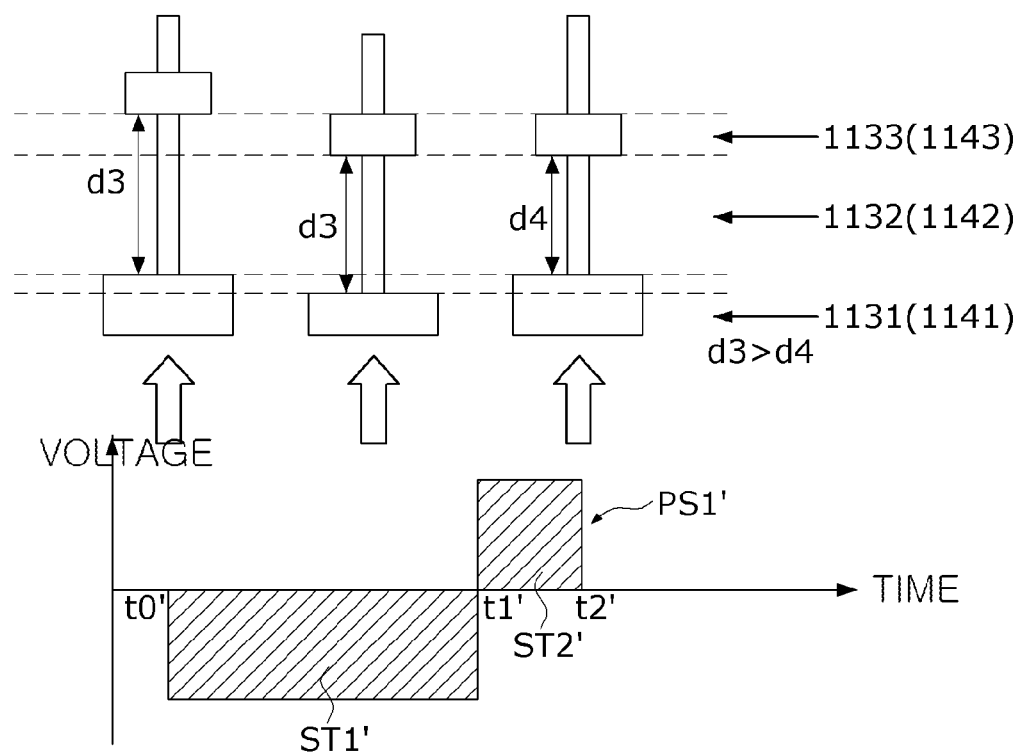

[FIG.17b]
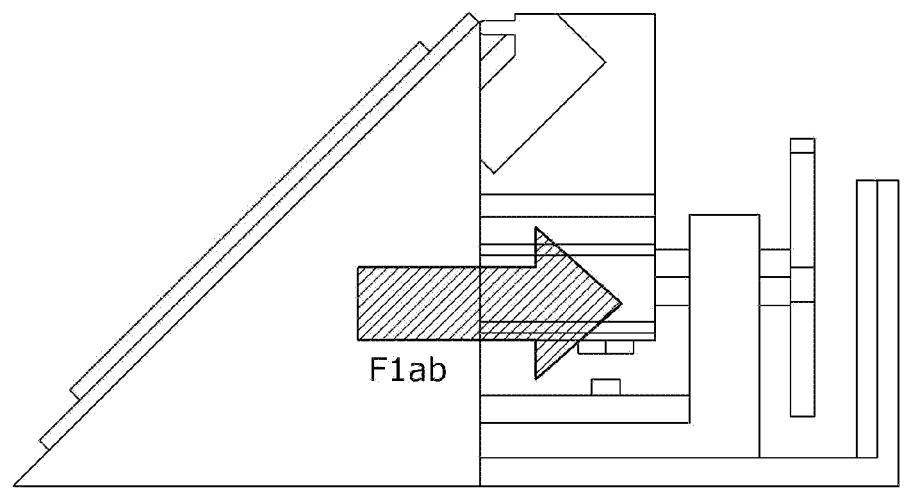
[FIG.18]
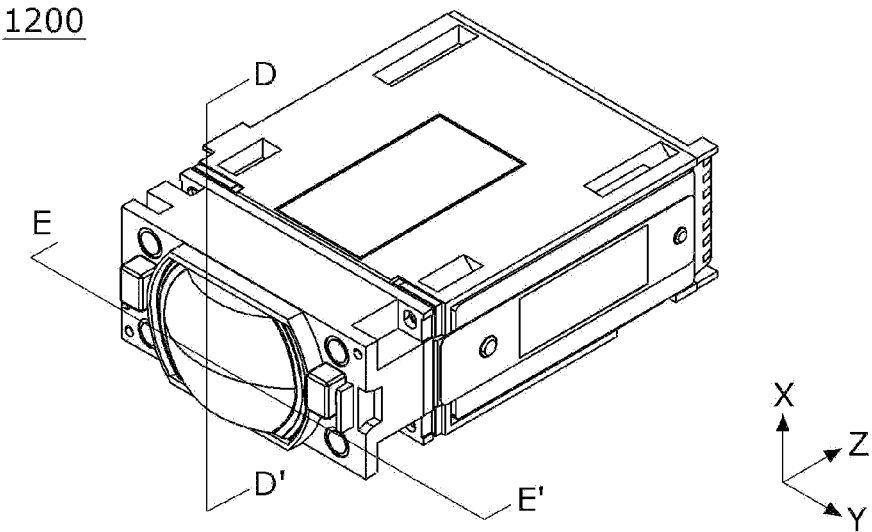

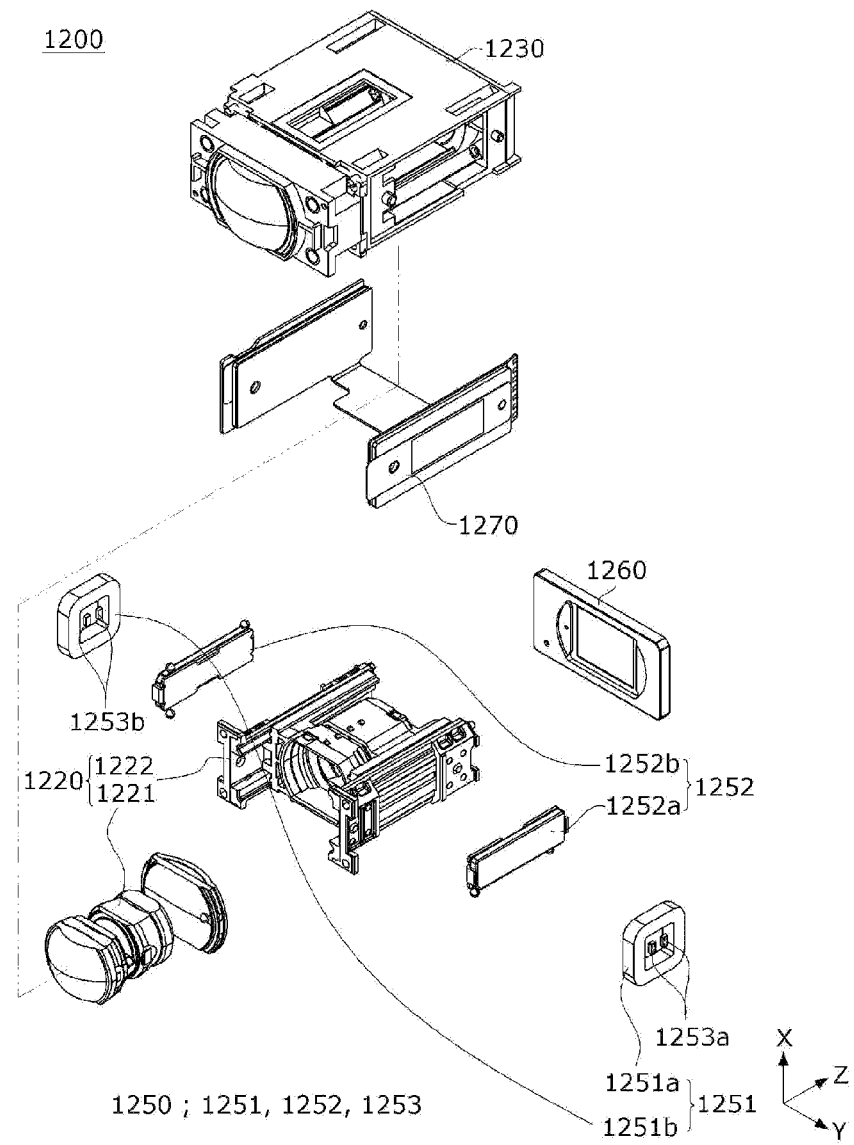

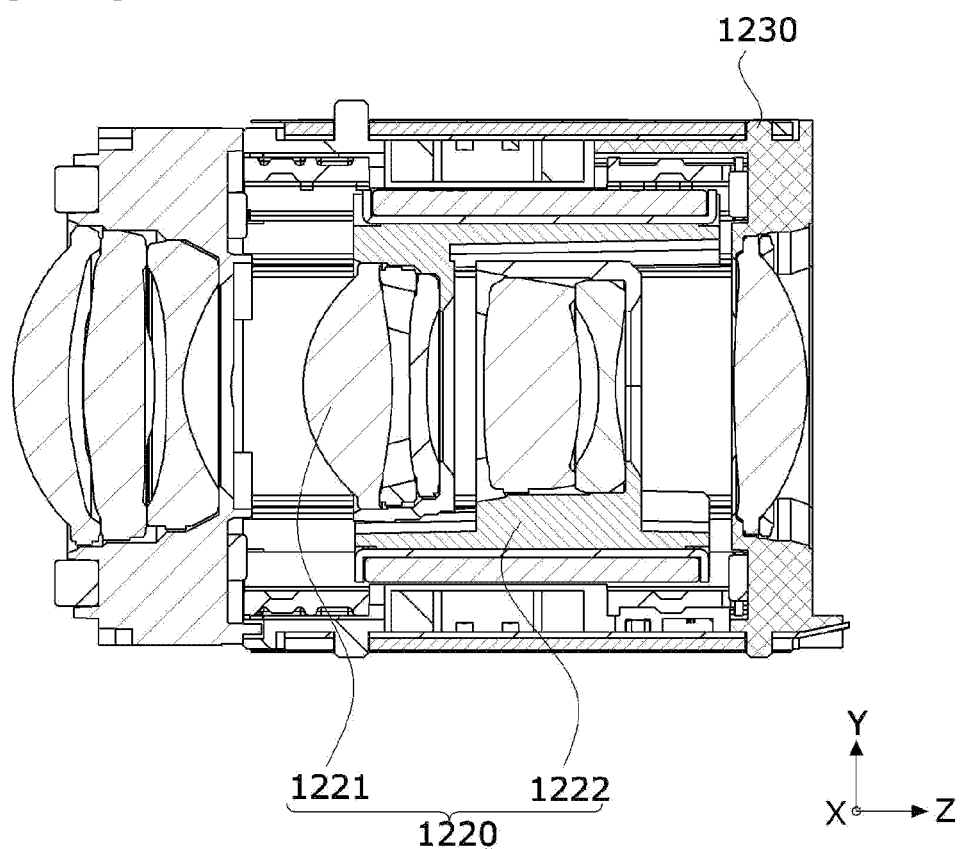
[FIG.20]

[FIG.21]
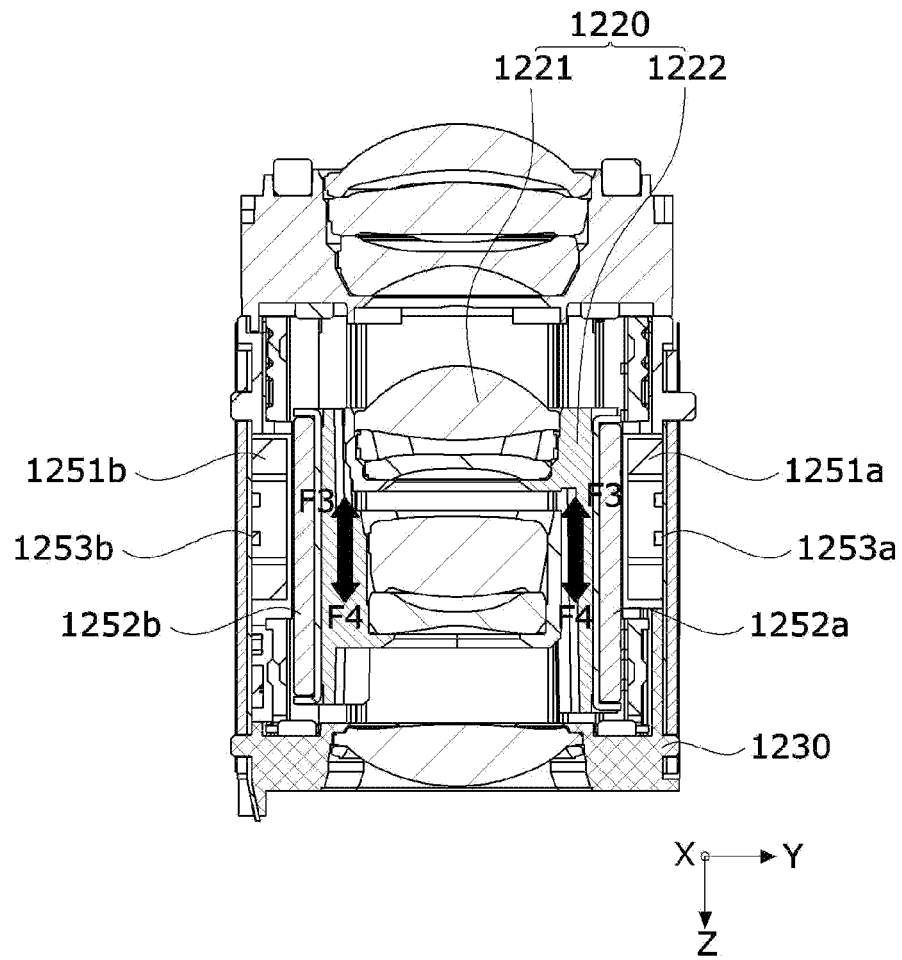
[FIG.22]
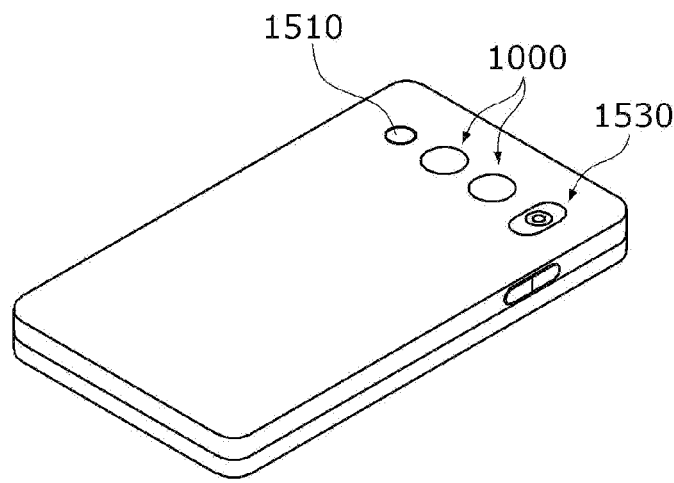

[FIG.23]
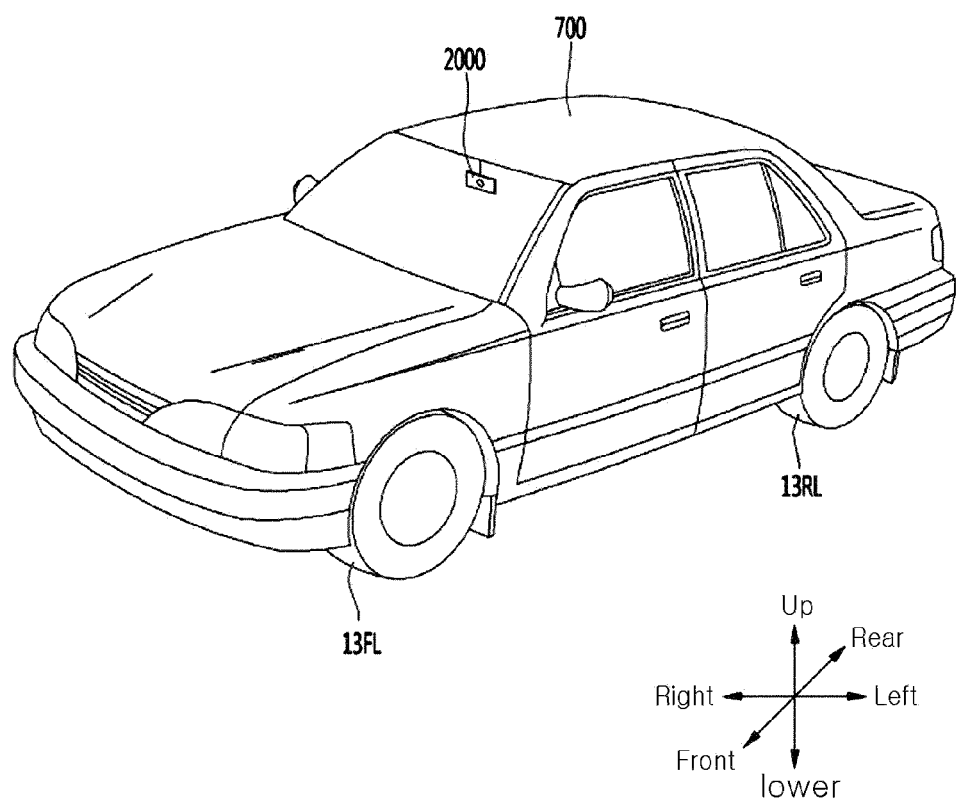

CAMERA ACTUATOR AND CAMERA DEVICE COMPRISING SAME

CROSS REFERENCE TO RELATED APPLICATIONS

This application is the National Phase of PCT International Application No. PCT/KR2021/006224, filed on May 18, 2021, which claims priority under 35 U.S.C. § 119(a) to Patent Application No. 10-2020-0059768, filed in the Republic of Korea on May 19, 2020, all of which are hereby expressly incorporated by reference into the present application.

TECHNICAL FIELD

The present invention relates to a camera actuator and a camera device including the same.

BACKGROUND ART

Cameras are devices for taking pictures or videos of subjects and are mounted on portable devices, drones, vehicles, or the like. A camera device may have an image stabilization (IS) function of correcting or preventing the image shake caused by the movement of a user in order to improve the quality of the image, an auto focusing function of aligning a focal length of a lens by automatically adjusting an interval between an image sensor and the lens, and a zooming function of capturing a remote subject by increasing or decreasing the magnification of the remote subject through a zoom lens.

Meanwhile, a pixel density of the image sensor increases as a resolution of the camera increases, and thus a size of the pixel becomes smaller, and as the pixel is smaller, the amount of light received for the same time decreases. Therefore, as the camera has a higher pixel density, the image shake caused by hand shaking occurring when a shutter speed is decreased in a dark environment may more severely occur. As a representative image stabilization (IS) technique, there is an optical image stabilizer (OIS) technique of correcting motion by changing a path of light.

According to the general OIS technique, the motion of the camera may be detected through a gyro sensor or the like, and a lens may be tilted or moved based on the detected motion, or a camera module including a lens and an image sensor may be tilted or moved. When the lens or the camera module including the lens and the image sensor is tilted or moved for OIS, it is necessary to additionally secure a space for tilting or moving around the lens or the camera module.

Meanwhile, an actuator for OIS may be disposed around the lens. In this case, the actuator for OIS may include actuators in charge of two axes (i.e., an X axis and a Y axis perpendicular to a Z-axis) tiling, which is an optical axis.

However, according to the needs of ultra-slim and ultra-small camera devices, there is a large space constraint for arranging the actuator for OIS, and it may be difficult to secure a sufficient space where the lens or the camera module itself including the lens and the image sensor may be tilted or moved for OIS. In addition, as the camera has a higher pixel density, it is preferable that a size of the lens be increased to increase the amount of received light, and there may be a limit to increasing the size of the lens due to a space occupied by the actuator for OIS. In addition, when a zoom function, an AF function, and an OIS function are all included in the camera device, there is also a problem that an OIS magnet and an AF or zoom magnet are disposed close to each other to cause magnetic field interference.

In addition, spatial restrictions or limitations for moving the lens are present.

Technical Problem

The present invention is directed to providing a camera actuator for performing a two-axis tilt through rotation plates connected through a bridge.

In addition, an embodiment is directed to providing a camera actuator for easily performing a two-axis tilt by adjusting a position of a contact point for tilting an optical member.

In addition, an embodiment is directed to providing a camera actuator applicable to ultra-slim, ultra-small, and high-resolution cameras.

An object of the embodiment is not limited thereto and will also include objects or effects which may be identified from configurations or embodiments.

Technical Solution

A camera actuator according to an embodiment of the present invention includes a holder disposed on a lower portion, a rotation part disposed in the holder, an optical member disposed on the rotation part, and a first driving part configured to tilt the optical member along a first axis and a second driving part configured to tilt the optical member along a second axis by pressing the rotation part, wherein the rotation part may include a first rotation plate disposed therein, a second rotation plate disposed outside the first rotation plate, a fixing plate disposed outside the second rotation plate, a first bridge positioned between the first rotation plate and the second rotation plate and corresponding to the first axis, and a second bridge positioned between the second rotation plate and the fixing plate and corresponding to the second axis.

The first bridge may be positioned on a virtual line bisecting the first rotation plate along the second axis.

The second bridge may be positioned on a virtual line bisecting the second rotation plate along the first axis.

The first driving part may include a first piezoelectric part which expands and contracts in an optical axis direction, a first link part connected to the first piezoelectric part, a first moving part connected to the first link part, a first operating part connected to the first moving part and coming into contact with the first rotation plate, and a first suction part disposed adjacent to the first rotation plate and configured to pull the first rotation plate.

The second driving part may include a second piezoelectric part which expands and contracts in the optical axis direction, a second link part connected to the second piezoelectric part, a second moving part connected to the second link part, a second operating part connected to the second moving part and coming into contact with the second rotation plate, and a second suction part disposed adjacent to the second rotation plate and configured to pull the second rotation plate.

The first link part and the first moving part may move in response to mechanical deformation of the first piezoelectric part, the second link part and the second moving part may move in response to mechanical deformation of the second piezoelectric part, a position of the first moving part may be changed with respect to the first link part when the first link part moves at a predetermined speed or higher, and a position of the second moving part may be changed with respect to the second link part when the second link part moves at a predetermined speed or higher.

The camera actuator may further include a bracket disposed in the holder.

The bracket may include a bracket support part disposed on the holder, a first protrusion and a second protrusion positioned on the bracket support part, and a third protrusion disposed to be spaced apart from the first protrusion and the second protrusion in the optical axis direction.

The first protrusion may include a first hole, the second protrusion may include a second hole, the third protrusion may include a third hole and a fourth hole, the first hole may overlap the third hole in the optical axis direction, and the second hole may overlap the fourth hole in the optical axis direction.

The first link part may pass through the first hole and the third hole, and the second link part may pass through the second hole and the fourth hole.

Advantageous Effects

According to an embodiment of the present invention, it is possible to implement a camera actuator for performing a two-axis tilt through rotation plates connected through a bridge.

In addition, according to the embodiment, it is possible to implement a camera actuator for easily performing a two-axis tilt by adjusting a position of a contact point for tilting an optical member.

In addition, it is possible to provide a camera actuator applicable to ultra-slim, ultra-small, and high-resolution cameras. In particular, it is possible to efficiently dispose an actuator for OIS even without an increase in the overall size of a camera device.

According to an embodiment of the present invention, tilting in an X-axis direction and tilting in a Y-axis direction do not cause magnetic field interference with each other, it is possible to implement the tilting in the X-axis direction and the tilting in the Y-axis direction in a stable structure, and it is possible to achieve a precise OIS function because magnetic field interference with an AF or zooming actuator does not occur.

According to the embodiment of the present invention, it is possible to secure a sufficient amount of light by eliminating the size limitation of the lens and implement OIS with low power consumption.

Various and beneficial advantages and effects of the present invention are not limited to the above-described contents and will be more easily understood in the process of describing specific embodiments of the present invention.

DESCRIPTION OF DRAWINGS

FIG. 1 is a perspective view of a camera module according to an embodiment.

FIG. 2 is an exploded perspective view of the camera module according to the embodiment.

FIG. 3 is a cross-sectional view along line A-A' in FIG. 1.

FIG. 4 is a perspective view of a first camera actuator according to the embodiment.

FIG. 5 is an exploded perspective view of the first camera actuator according to the embodiment.

FIG. 6 is a perspective view of a holder of the first camera actuator according to the embodiment.

FIG. 7 is a perspective view of a bracket of the first camera actuator according to the embodiment.

FIG. 8A is a perspective view of a first driving part of the first camera actuator according to the embodiment.

FIG. 8B is an exploded perspective view of the first driving part of the first camera actuator according to the embodiment.

FIG. 8C is a side view of a first operating part of the first camera actuator according to the embodiment.

FIG. 9A is a perspective view of a second driving part of the first camera actuator according to the embodiment.

FIG. 9B is an exploded perspective view of the second driving part of the first camera actuator according to the embodiment.

FIG. 9C is a perspective view of the first operating part of the first camera actuator according to the embodiment.

FIG. 9D is a side view of the first operating part of the first camera actuator according to the embodiment.

FIG. 10 is a perspective view of a first board part and a position sensor part of the first camera actuator according to the embodiment.

FIG. 11 is a perspective view of a rotation part and an optical member of the first camera actuator according to the embodiment.

FIG. 12 is a perspective view of the rotation part of the first camera actuator according to the embodiment.

FIG. 13 is a front view of the rotation part of the first camera actuator according to the embodiment.

FIG. 14 is a top perspective view of the first camera actuator according to the embodiment.

FIG. 15 is a front view of the first camera actuator according to the embodiment in which the rotation part and the optical member are removed.

FIGS. 16A and 16B are views for describing the forward movement by the first driving part of the first camera actuator according to the embodiment.

FIGS. 17A and 17B are views for describing the backward movement by the first driving part of the first camera actuator according to the embodiment.

FIG. 18 is a perspective view of a second camera actuator according to the embodiment.

FIG. 19 is an exploded perspective view of the second camera actuator according to the embodiment.

FIG. 20 is a cross-sectional view along line D-D' in FIG. 18.

FIG. 21 is a cross-sectional view along line E-E' in FIG. 18.

FIG. 22 is a perspective view of a mobile terminal to which the camera module according to the embodiment is applied.

FIG. 23 is a perspective view of a vehicle to which the camera module according to the embodiment is applied.

MODES OF THE INVENTION

Since the present invention may have various changes and various embodiments, specific embodiments are illustrated and described in the accompanying drawings.

However, it should be understood that it is not intended to limit specific embodiments, and it should be understood to include all modifications, equivalents, and substitutes included in the spirit and scope of the present invention.

Terms including ordinal numbers such as second or first may be used to describe various components, but the components are not limited by the terms. The terms are used only for the purpose of distinguishing one component from another. For example, a second component may be referred to as a first component, and similarly, the first component may also be referred to as the second component without departing from the scope of the present invention. The term "and/or" includes a combination of a plurality of related listed items or any of the plurality of related listed items.

When a certain component is described as being "connected" or "coupled" to another component, it is understood that it may be directly connected or coupled to another component or other components may also be present therebetween. On the other hand, when a certain component is described as being "directly connected" or "directly coupled" to another component, it should be understood that other components are not present therebetween.

The terms used in the application are only used to describe specific embodiments and are not intended to limit the present invention. The singular expression includes the plural expression unless the context clearly dictates otherwise. In the application, it should be understood that terms such as "comprise" or "have" are intended to specify that a feature, number, step, operation, component, part, or combination thereof described in the specification is present, but do not preclude the possibility of the presence or addition of one or more other features, numbers, steps, operations, components, parts, or combinations thereof.

Unless defined otherwise, all terms used herein, including technical or scientific terms, have the same meaning as commonly understood by those of ordinary skill in the art to which the present invention pertains. Terms such as those defined in a commonly used dictionary should be construed as having a meaning consistent with the meaning in the context of the related art and should not be construed in an ideal or excessively formal meaning unless explicitly defined in the application.

Hereinafter, embodiments will be described in detail with reference to the accompanying drawings, and the same or corresponding components are given the same reference numerals regardless of the reference numerals, and overlapping descriptions thereof will be omitted.

FIG. 1 is a perspective view of a camera module according to an embodiment,

FIG. 2 is an exploded perspective view of a camera module according to the embodiment, and FIG. 3 is a cross-sectional view along line A-A' in FIG. 1.

Referring to FIGS. 1 and 2, a camera module 1000 according to the embodiment may include a cover CV, a first camera actuator 1100, a second camera actuator 1200, and a circuit board 1300. Here, the first camera actuator 1100 may be used interchangeably with a "first actuator." In addition, the second camera actuator 1200 may be used interchangeably with a "second actuator."

The cover CV may cover the first camera actuator 1100 and the second camera actuator 1200. It is possible to increase a coupling force between the first camera actuator 1100 and the second camera actuator 1200 by the cover CV.

Furthermore, the cover CV may be made of a material which blocks electromagnetic waves. Therefore, it is possible to easily protect the first camera actuator 1100 and the second camera actuator 1200 in the cover CV.

In addition, the first camera actuator 1100 may be an optical image stabilizer (OIS) actuator.

The first camera actuator 1100 may include a fixed lens disposed in a predetermined barrel (not shown). In addition, the lens may include, for example, a fixed focal length lens. The fixed focal length lens may be referred to as a "single focal length lens" or a "single lens."

The first camera actuator 1100 may change an optical path. In the embodiment, the first camera actuator 1100 may change the optical path vertically through an optical member (e.g., a mirror) therein. With this configuration, even when a thickness of a mobile terminal is decreased, a configuration of a lens that is greater than the thickness of the mobile terminal is disposed in the mobile terminal through a change in the optical path so that magnification, auto focusing (AF) and OIS functions may be performed.

The second camera actuator 1200 may be disposed at a rear end of the first camera actuator 1100. The second camera actuator 1200 may be coupled to the first camera actuator 1100. In addition, mutual coupling may be performed by various methods.

In addition, the second camera actuator 1200 may be a zoom actuator or an AF actuator. For example, the second camera actuator 1200 may support one lens or a plurality of lenses and perform the AF function or the zoom function by moving the lenses according to a predetermined control signal of a control part.

The circuit board 1300 may be disposed at a rear end of the second camera actuator 1200. The circuit board 1300 may be electrically connected to the second camera actuator 1200 and the first camera actuator 1100. In addition, a plurality of circuit boards 1300 may be provided.

The camera module according to the embodiment may be formed as a single camera module or a plurality of camera modules. For example, the plurality of camera modules may include a first camera module and a second camera module.

In addition, the first camera module may include a single actuator or a plurality of actuators. For example, the first camera module may include the first camera actuator 1100 and the second camera actuator 1200.

In addition, the second camera module may be disposed in a predetermined housing (not shown) and include an actuator (not shown) which may drive a lens part. The actuator may be a voice coil motor, a micro actuator, a silicon actuator, or the like and applied in various methods, such as an electrostatic method, a thermal method, a bimorph method, and an electrostatic force method but is not limited thereto. In addition, in the specification, the camera actuator may be referred to as an actuator or the like. In addition, a camera module including a plurality of camera modules may be mounted in various electronic devices such as a mobile terminal.

Referring to FIG. 3, the camera module according to the embodiment may include the first camera actuator 1100 for performing the OIS function and the second camera actuator 1200 for performing the zooming function and the AF function.

Light may be incident into the camera module through an opening region positioned on an upper surface of the first camera actuator 1100. In other words, the light may be incident into the first camera actuator 1100 in an optical axis direction (e.g., an X-axis direction), and the optical path may be changed in a vertical direction (e.g., a Z-axis direction) through the optical member. In addition, the light may pass through the second camera actuator 1200 and may be incident on an image sensor IS positioned at one end of the second camera actuator 1200 (PATH).

In the specification, the bottom surface refers to one side in a first direction. In addition, the first direction is the X-axis direction in the drawings. A second direction is a Y-axis direction in the drawings. The second direction is a direction perpendicular to the first direction. In addition, a third direction is the Z-axis direction in the drawings. The third direction is perpendicular to both the first direction and the second direction. Here, the third direction (Z-axis direction) corresponds to the optical axis direction, and the first direction (X-axis direction) and the second direction (Y-axis direction) are directions perpendicular to the optical axis and may be tilted by the first camera actuator. A detailed description thereof will be given below.

In addition, in the following description of the first and second camera actuators, the optical axis direction is the third direction (Z axis direction) and will be described below based thereon.

In addition, with this configuration, the camera module according to the embodiment may reduce the spatial limitations of the first camera actuator and the second camera actuator by changing the optical path. In other words, the camera module according to the embodiment may extend the optical path while minimizing the thickness of the camera module in response to the change in the optical path. Furthermore, it should be understood that the second camera actuator may provide a high range of magnification by controlling a focus or the like in the extended optical path.

In addition, the camera module according to the embodiment may implement OIS by controlling the optical path by the first camera actuator, thereby minimizing the occurrence of a decenter or tilt phenomenon and providing the best optical characteristics.

Furthermore, the second camera actuator 1200 may include an optical system and a lens driving part. For example, at least one of a first lens assembly, a second lens assembly, a third lens assembly, and a guide part (e.g., a guide rail or a guide pin) may be disposed in the second camera actuator 1200.

In addition, the second camera actuator 1200 may include a coil and a magnet and perform a high-magnification zooming function.

For example, the first lens assembly and the second lens assembly may be a moving lens that moves through the coil, the magnet, and a guide pin, and the third lens assembly may be a fixed lens, but the present invention is not limited thereto. For example, the third lens assembly may perform a function of a focator by which light forms an image at a specific position, and the first lens assembly may perform a function of a variator for re-forming an image formed by the third lens assembly, which is the focator, at another position. Meanwhile, the first lens assembly may be in a state in which a magnification change is large because a distance to a subject or an image distance is greatly changed, and the first lens assembly, which is the variator, may play an important role in a focal length or magnification change of the optical system. Meanwhile, imaging points of an image formed by the first lens assembly, which is the variator, may be slightly different depending on a position. Therefore, the second lens assembly may perform a position compensation function for the image formed by the variator. For example, the second lens assembly may perform a function of a compensator for accurately forming an image at an actual position of the image sensor using the imaging points of the image formed by the first lens assembly which is the variator. For example, the first lens assembly and the second lens assembly may be driven by an electromagnetic force due to the interaction between the coil and the magnet. The above description may be applied to a lens assembly to be described below.

Meanwhile, when the OIS actuator and the AF actuator or the zoom actuator are disposed according to the embodiment of the present invention, the magnetic field interference with an AF magnet or a zoom magnet can be prevented when OIS is driven. Since a first driving magnet of the first camera actuator 1100 is disposed separately from the second camera actuator 1200, the magnetic field interference between the first camera actuator 1100 and the second camera actuator 1200 can be prevented. In the specification, OIS may be used interchangeably with terms such as hand shaking correction, optical image stabilization, optical image correction, shake correction, and the like.

FIG. 4 is a perspective view of a first camera actuator according to the embodiment, and FIG. 5 is an exploded perspective view of the first camera actuator according to the embodiment.

Referring to FIGS. 4 and 5, the first camera actuator 1100 according to the embodiment may include a holder 1110, a bracket 1120, first and second driving parts 1130 and 1140, a first board part 1150, a position sensor part 1160, a rotation part 1170, and an optical member 1180.

First, the holder 1110 may be positioned at an outer side of the first camera actuator 1100. In addition, the holder 1110 may support the bracket 1120, the first and second driving parts 1130 and 1140, the first board part 1150, the position sensor part 1160, the rotation part 1170, and the optical member 1180.

The bracket 1120 may be positioned on the holder 1110. In addition, the bracket 1120 may support the first driving part 1130. More specifically, the bracket 1120 may support a first link part and a second link part of the first and second driving parts 1130 and 1140.

In addition, the bracket 1120 may support an additional board seated on an upper portion thereof and a plurality of Hall sensors of the position sensor part 1160. In addition, the bracket 1120 can improve the reliability according to the movement and load of the link parts by integrally supporting the first driving part and the second driving part.

The first and second driving parts 1130 and 1140 may tilt or yaw-tilt (or rotate) the rotation part 1170 about a yaw axis. In addition, the first and second driving parts 1130 and 1140 may tilt or pitch-tilt (or rotate) the rotation part 1170 about a pitch axis. In the specification, a yaw direction corresponds to the first axis, and the yaw tilt is rotation about the yaw direction. In addition, a pitch direction corresponds to the second axis, and the pitch tilt is rotation about the pitch direction. In addition, the yaw direction is one direction on an XZ plane and a vertical direction of an inclined rotation part, and the pitch direction is one direction on a YZ plane and a horizontal direction of the inclined rotation part.

In the embodiment, the first driving part 1130 may yaw-tilt the rotation part 1170 by moving positions of a first moving part and a first operating part through the first link part moving in the third direction (Z-axis direction). In addition, the second driving part 1140 may pitch-tilt the rotation part 1170 by moving a second moving part and a second operating part through the second link part moving in the third direction (Z-axis direction).

The first board part 1150 may be seated on the holder 1110. In addition, the first board part 1150 may be electrically connected to the first driving part to change lengths of a first piezoelectric part and a second piezoelectric part by the first driving part. In other words, an electrical signal (e.g., voltage) input through the first board part 1150 may expand the first piezoelectric part and the second piezoelectric part in the third direction (Z-axis direction).

In addition, the first board part 1150 may include a circuit board having a wiring pattern that may be electrically connected, such as a rigid printed circuit board (PCB), a flexible PCB, and a rigid flexible PCB. However, the present invention is not limited to these types.

The position sensor part 1160 may include a first Hall sensor, a second Hall sensor, a first magnet, and a second magnet. Any one of the first Hall sensor and the first magnet may come into contact with the first operating part. In addition, the other of the first Hall sensor and the first magnet may come into contact with the bracket 1120. Alternatively, the other of the first Hall sensor and the first magnet may come into contact with the additional board on the bracket 1120. Hereinafter, the first magnet coming into contact with the first operating part and the first Hall sensor coming into contact with the bracket 1120 will be described.

Therefore, the first magnet coming into contact with the first operating part may move in response to the movement of the first operating part in the third direction (Z-axis direction). In addition, the first Hall sensor may detect a change in magnetic force according to the movement of the first magnet.

Likewise, any one of the second Hall sensor and the second magnet may come into contact with the second operating part. In addition, the other of the second Hall sensor and the second magnet may come into contact with the bracket 1120. Alternatively, the other of the second Hall sensor and the second magnet may come into contact with the additional board on the bracket 1120. Hereinafter, the second magnet coming into contact with the second operating part and the second Hall sensor coming into contact with the bracket 1120 will be described.

In addition, the second magnet coming into contact with the second operating part may move in response to the movement of the second operating part in the third direction (Z-axis direction). In addition, the second Hall sensor may detect a change in magnetic force according to the movement of the second magnet.

The rotation part 1170 may be positioned on the holder 1110 and supported by the holder 1110. In addition, the rotation part 1170 may support the optical member 1180. In other words, the optical member 1180 may be seated on the rotation part 1170.

In the embodiment, some regions of the rotation part 1170 may be yaw-tilted by the first driving part. In addition, some regions of the rotation part 1170 may be pitch-tilted by the second driving part. The optical member 1180 may also be yaw-tilted or pitch-tilted in response to the rotation (yaw/pitch tilt) of the rotation part 1170.

The rotation part 1170 may be yaw-tilted by pressing and coupling forces by the first driving part and pitch-tilted by pressing and coupling forces by the second driving part.

The optical member 1180 may include a reflective member such as a prism or a mirror. The optical member 1180 may further include at least one lens in front or behind the reflective member.

In addition, as described above, since the optical member 1180 is yaw-tilted or pitch-tilted in response to the rotation of the rotation part 1170, the optical path may be changed in a direction perpendicular to the optical axis (Z-axis direction) as described above. Therefore, the first camera actuator according to the embodiment may perform OIS.

FIG. 6 is a perspective view of a holder of the first camera actuator according to the embodiment.

Referring to FIG. 6, the holder 1110 of the first camera actuator according to the embodiment may be positioned at the outer side of the first camera actuator.

In the embodiment, the holder 1110 may include a side wall portion 1111, a first lower portion 1112, a second lower portion 1113, and a rotation support part 1114.

The side wall portion 1111 may be positioned at one side of the holder 1110. The side wall portion 1111 may come into contact with the first board part.

The first lower portion 1112 may come into vertical contact with the side wall portion 1111. The first lower portion 1112 may be formed integrally with the side wall portion 1111.

The first lower portion 1112 may be positioned at a lowermost side of the first camera actuator. In addition, the first lower portion 1112 may support the first board part.

The second lower portion 1113 may come into contact with the first lower portion 1112. The second lower portion 1113 may extend from the first lower portion 1112 in the third direction (Z-axis direction). In this case, the second lower portion 1113 and the first lower portion 1112 may be integrally formed. The rotation part 1170 may be positioned on the second lower portion 1113.

The rotation support part 1114 may come into contact with the second lower portion 1113. The rotation support part 1114 may come into contact with a side surface of the second lower portion 1113 and extend in the first direction (X-axis direction).

In addition, the rotation support part 1114 may have an inclined surface 1114a inclined with respect to the YZ plane. The inclined surface 1114a may have a first inclination θa with respect to the YZ plane.

In addition, the rotation part may be seated on the inclined surface 1114a. Therefore, the rotation part may also have the first inclination θa with respect to the YZ plane.

In other words, the rotation support part 1114 may support the rotation part to be inclined at a predetermined angle (e.g., the first inclination) while supporting the rotation part. Therefore, light incident through the upper portion may be reflected by the inclined optical member. Therefore, the first camera actuator according to the embodiment can simultaneously change the optical path, thereby minimizing a thickness (e.g., a length in the first direction) and improving a degree of freedom of the lens on the optical path to improve optical performance.

FIG. 7 is a perspective view of a bracket of the first camera actuator according to the embodiment.

Referring to FIG. 7, the bracket 1120 of the first camera actuator may include a bracket support part 1121, a first protrusion 1122, a second protrusion 1123, and a third protrusion 1124.

The bracket support part 1121 may be positioned at a lower portion of the bracket 1120. The bracket support part 1121 may be positioned on the first lower portion and the second lower portion of the holder 1110 described above. Therefore, the bracket support part 1121 may overlap the first lower portion and the second lower portion in the first direction (X-axis direction).

The first protrusion 1122, the second protrusion 1123, and the third protrusion 1124 may be positioned at edges of the bracket support part 1121.

The first protrusion 1122 may be positioned on an upper surface of the bracket support part 1121 and extend in the first direction (X-axis direction). The first protrusion 1122 may be formed perpendicular to the bracket support part 1121.

The first protrusion 1122 may be positioned adjacent to the edge of the bracket support part 1121. Specifically, the first protrusion 1122 may be positioned adjacent to one surface facing the second direction (Y-axis direction).

In addition, the first protrusion 1122 may include a first hole 1122a. The first hole 1122a may be positioned in an upper portion of the first protrusion 1122.

The second link part may be seated in the first hole 1122a.

The second protrusion 1123 may be positioned on the upper surface of the bracket support part 1121 and extend in the first direction (X-axis direction). The second protrusion 1123 may be formed perpendicular to the bracket support part 1121.

The second protrusion 1123 may be positioned adjacent to the edge of the bracket support part 1121. Specifically, the second protrusion 1123 may be positioned adjacent to the other surface adjacent to the surface facing the second direction (Y-axis direction). In the embodiment, the second protrusion 1123 may be positioned symmetrically with the first protrusion 1122 in the first direction (X-axis direction) and the third direction (Z-axis direction).

The second protrusion 1123 may include a second hole 1123*a*. The second hole 1123*a* may be positioned in an upper portion of the second protrusion 1123. The first link part may be seated in the second hole 1123*a*.

In addition, the second hole 1123*a* may be positioned to correspond to a fourth hole 1123*b* of the third protrusion. For example, the second hole 1123*a* may be disposed symmetrically with the fourth hole 1123*b* in the first direction (X-axis direction). Therefore, the first link part may pass through the second hole 1123*a* and the fourth hole 1123*b*. In addition, the first link part may be supported by the second hole 1123*a* and the fourth hole 1123*b*, and when the first link part moves in the third direction (Z-axis direction), a frictional force may be applied to the first link part.

The third protrusion 1124 may be positioned adjacent to the edge of the bracket support part 1121. Specifically, the third protrusion 1124 may be positioned to face the first protrusion 1122 and the second protrusion 1123. The third protrusion 1124 may be positioned to correspond to the first protrusion 1122 in the first direction (X-axis direction). In addition, the third protrusion 1124 may be positioned to correspond to the second protrusion 1123 in the first direction (X-axis direction).

The third protrusion 1124 may include a third hole 1124*a* and the fourth hole 1124*b*. The third hole 1124*a* and the fourth hole 1124*b* may be positioned in an upper portion of the third protrusion 1124.

In addition, the third hole 1124*a* may be positioned to correspond to the first hole 1122*a*. In addition, the fourth hole 1124*b* may be positioned to correspond to the second hole 1123*b*. In the embodiment, the third hole 1124*a* may be positioned to face the first hole 1122*a* in the first direction (X-axis direction). In addition, the fourth hole 1124*b* may be positioned to face the second hole 1123*b* in the first direction (X-axis direction). Therefore, the second link part may pass through the first hole 1122*a* and the third hole 1124*a* and may be supported by the first protrusion 1122 and the third protrusion 1124. In addition, the first link part may pass through the second hole 1123*a* and the fourth hole 1124*b* and may be supported by the second protrusion 1123 and the third protrusion 1124.

In addition, a length of the third protrusion 1124 in the second direction (Y-axis direction) may be greater than a length of the first protrusion 1122 or the second protrusion 1123 in the second direction (Y-axis direction). In addition, the first protrusion 1122 and the second protrusion 1123 may be disposed to be spaced apart from each other. With this configuration, it is possible to improve a support force for the first link part and the second link part by the third protrusion 1124. In addition, it is possible to easily secure an arrangement space of the first driving part by providing a separation space between the first protrusion 1122 and the second protrusion 1123.

In addition, the first protrusion 1122, the second protrusion 1123, and the third protrusion 1124 may be integrally formed with the bracket support part 1121.

FIG. 8A is a perspective view of a first driving part of the first camera actuator according to the embodiment, FIG. 8B is an exploded perspective view of the first driving part of the first camera actuator according to the embodiment, and FIG. 8C is a side view of a first operating part of the first camera actuator according to the embodiment.

Referring to FIGS. 8A and 8B, the first driving part 1130 of the first camera actuator may include a first piezoelectric part 1131, a first link part 1132, a first moving part 1133, a first operating part 1134, and a first suction part 1135.

The first piezoelectric part 1131 may be formed of a piezoelectric element. In the embodiment, the first piezoelectric part 1131 may include a piezoelectric element made of a ceramic material.

In the embodiment, in the first piezoelectric part 1131, an electric field may be formed due to voltage application and a length thereof may be changed. More specifically, the first piezoelectric part 1131 may be formed of a crystal lattice in which positive and negative ions are elastically connected. Therefore, in the first piezoelectric part 1131, the positive and negative ions may move when the electric field is formed. For example, the positive ions may be pulled in a direction of the electric field, and the negative ions may be pulled in a direction opposite to the direction of the electric field. In addition, a stress corresponding to the movement or the force is generated, and the crystal lattice may be deformed.

The first piezoelectric part 1131 may be a polycrystalline body, and the crystal lattice may generally be divided into several polarizations having different polarization directions. In addition, the first piezoelectric part 1131 may be in a state in which the polarization to the whole from the polarization state is canceled. At this time, when the electric field is applied to the first piezoelectric part 1131, the polarization direction inside the crystal is polarized according to the direction of the electric field, and at the same time, a length of a crystal grain may be increased in the direction of the electric field. Conversely, when the electric field is removed, the first piezoelectric part 1131 may maintain a state in which the whole has been polarized. Therefore, the first piezoelectric part 1131 may operate in an expanded state in which each crystalline body expands or a contracted state in which the crystalline body contracts according to a voltage. In other words, when an electrical signal such as a voltage is applied to the first piezoelectric part 1131, the first piezoelectric part 1131 may be mechanically deformed (expand and contract in the third direction (Z-axis direction)). With this configuration, the first camera actuator according to the embodiment has no electromagnetic interference and has little influence on the shape, and thus can provide high reliability and improved energy efficiency. The first piezoelectric part 1131 may be formed of a plurality of layers. In addition, different voltages may be applied to the plurality of layers. Therefore, as described above, the first piezoelectric part 1131 may contract or expand.

The first link part 1132 may be connected to the first piezoelectric part 1131. Therefore, the first link part 1132 may move in the third direction (Z-axis direction) in response to the expansion and contraction of the first piezoelectric part 1131.

The first link part 1132 may be in the form of a shaft. In addition, the first link part 1132 may pass through the second hole and the fourth hole as described above. Therefore, the first link part 1132 may be supported by the bracket 1120.

The first moving part 1133 may be connected to the first link part 1132. The first moving part 1133 may cover the first link part 1132. Furthermore, the first moving part 1133 may come into contact with the first operating part 1134. In the embodiment, the first moving part 1133 may have one side coming into contact with the first link part 1132 and the other side coming into contact with the first operating part 1134.

With this configuration, the first moving part 1133 may move in the third direction (Z-axis direction) in response to the movement of the first link part 1132. However, the first moving part 1133 may have a predetermined frictional force with the first link part 1132. For example, the first moving part 1133 may move in the third direction (Z-axis direction) by an inertial force when the first link part 1132 moves at a predetermined speed or higher. In other words, a position of the first moving part 1133 may be changed relative to the first link part 1132. In other words, the position of the first moving part 1133 may be changed with respect to the first link part 1132.

Conversely, when the first link part 1132 moves at a lower speed than the predetermined speed, the first moving part 1133 may not move in the third direction (Z-axis direction). In other words, the position of the first moving part 1133 may be relatively maintained with respect to the first link part 1132.

The first moving part 1133 may include a coupling hole in the other side thereof. The coupling hole may come into contact with the first operating part 1134. A bonding member may be applied to the coupling hole. Therefore, the first operating part 1134 and the first moving part 1133 may be coupled to each other.

The first operating part 1134 may include a first operating support portion 1134a, a first operating extension portion 1134b, a first seating portion 1134c, and a first pressing portion 1134d.

The first operating support portion 1134a may be disposed to be spaced apart from the first link part 1132. In addition, the first operating support portion 1134a may at least partially come into contact with the first moving part 1133. For example, the first operating support portion 1134a may at least partially overlap the first moving part 1133 in the first direction (X-axis direction). For example, a bottom surface 1134as of the first operating support portion 1134a may be coupled to the first moving part 1133.

The first operating extension portion 1134b may be connected to the first operating support portion 1134a. The first operating extension portion 1134b may extend from a lower portion of the first operating support portion 1134a toward the first link part 1132. In other words, the first operating extension portion 1134b may be positioned between the first link part 1132 and the first operating support portion 1134a.

The first seating portion 1134c may be connected to the first operating support portion 1134a, and may have an upper surface inclined at a second inclination θb with respect to the ZY plane. The first suction part 1135 may be seated on the first seating portion 1134c.

In the embodiment, the first seating portion 1134c may include a first seating groove 1134h. The first seating groove 1134h may also be inclined at the second inclination θb with respect to the ZY plane. The second inclination θb may correspond to the first inclination. With this configuration, a suction force by the rotation part and the first suction part is uniformly provided, and thus the yaw tilt can be accurately performed.

The first pressing portion 1134d may be positioned adjacent to the first seating portion 1134c. In addition, the first pressing portion 1134d may come into contact with the first seating portion 1134c. The first pressing portion 1134d may be positioned between the first seating portion 1134c and the rotation part. Therefore, the first pressing portion 1134d may be positioned closer to the rotation part than the first seating portion 1134c. With this configuration, the first pressing portion 1134d may press the rotation part to be yaw-tilted. The first pressing portion 1134d may have a first contact surface 1134ds coming into contact with the rotation part. The first contact surface 1134ds may also be inclined at a third inclination θc with respect to the ZY plane. The third inclination θc may correspond to the second inclination θb. With this configuration, since the first pressing portion uniformly presses the rotation part, the yaw tilt can be accurately performed.

Furthermore, the first seating portion 1134c may suck the rotation part to be yaw-tilted through the first suction part 1135. In other words, the yaw tilt may be performed by the first pressing portion 1134d pressing the rotation part while moving in the third direction (Z-axis direction). In addition, even when the first pressing portion 1134d moves in the direction opposite to the third direction (Z-axis direction), the rotation part maintains the contact with the first pressing portion 1134d by the first suction part 1135, and thus the yaw tilt can be performed.

The first suction part 1135 may be seated in the first seating groove 1134h. The first suction part 1135 may be formed of a magnetic substance. For example, the first suction part 1135 may be a magnet and may form an attractive force with the rotation part made of a metallic material. Therefore, even when the first pressing portion 1134d moves in the third direction (Z-axis direction), the contact between the rotation part and the first pressing portion 1134d is maintained by the first suction part 1135, and thus the yaw tilt can be performed.

FIG. 9A is a perspective view of a second driving part of the first camera actuator according to the embodiment, FIG. 9B is an exploded perspective view of the second driving part of the first camera actuator according to the embodiment, FIG. 9C is a perspective view of the first operating part of the first camera actuator according to the embodiment, and FIG. 9D is a side view of the first operating part of the first camera actuator according to the embodiment.

Referring to FIGS. 9A to 9D, the second driving part 1140 of the first camera actuator may include a second piezoelectric part 1141, a second link part 1142, a second moving part 1143, a second operating part 1144, and a second suction part 1145.

The second piezoelectric part 1141 may be formed of a piezoelectric element like the first piezoelectric part 1131. In the embodiment, the second piezoelectric part 1141 may include a piezoelectric element made of a ceramic material.

In addition, in the second piezoelectric part 1141, an electric field may be formed due to voltage application and a length thereof may be changed. As described above, the second piezoelectric part 1141 may operate in an expanded state in which each crystalline body expands or a contracted state in which the crystalline body contracts according to a voltage. In other words, the second piezoelectric part 1141 may expand and contract in the third direction (Z-axis direction). With this configuration, the first camera actuator according to the embodiment has no electromagnetic interference and has little influence on the shape, and thus can provide high reliability and improved energy efficiency.

The second link part 1142 may be connected to the second piezoelectric part 1141. Therefore, the second link part 1142 may move in the third direction (Z-axis direction) in response to the expansion and contraction of the second piezoelectric part 1141.

The second link part 1142 may be in the form of a shaft. In addition, the second link part 1142 may pass through the first hole and the third hole as described above. Therefore, the second link part 1142 may be supported by the bracket

1120. In order to form a predetermined frictional force and coupling force between the first link part, the second link part 1142, and the first hole to the fourth hole of the bracket 1120, a coupling member having a frictional force may be positioned in the first hole to the fourth hole.

The second moving part 1143 may be connected to the second link part 1142. The second moving part 1143 may be positioned to surround the second link part 1142. Furthermore, the second moving part 1143 may come into contact with the second operating part 1144. In the embodiment, the second moving part 1143 may have one side coming into contact with the second link part 1142 and the other side coming into contact with the second operating part 1144.

With this configuration, the second moving part 1143 may move in the third direction (Z-axis direction) in response to the movement of the second link part 1142. However, the second moving part 1143 may have a predetermined frictional force with the second link part 1142. For example, the second moving part 1143 may move in the third direction (Z-axis direction) by an inertial force when the second link part 1142 moves at a predetermined speed or higher. In other words, a position of the second moving part 1143 may be relatively changed with respect to the second link part 1142. In other words, the position of the second moving part 1143 may be changed with respect to the second link part 1142.

Conversely, the second moving part 1143 may not move in the third direction (Z-axis direction) when the second link part 1142 moves at a lower speed than the predetermined speed. In other words, the position of the second moving part 1143 may be relatively maintained with respect to the second link part 1142.

The second moving part 1143 may include a coupling hole in the other side thereof. The coupling hole may come into contact with the second operating part 1144. A bonding member may be applied to the coupling hole. Therefore, the second operating part 1144 and the second moving part 1143 may be coupled to each other.

The second operating part 1144 may include a second operating support portion 1144a, a second operating extension 1144b, a second seating portion 1144c, and a second pressing portion 1144d.

The second operating support portion 1144a may be disposed to be spaced apart from the second link part 1142. In addition, the second operating support portion 1144a may at least partially come into contact with the second moving part 1143. For example, the second operating support portion 1144a may at least partially overlap the second moving part 1143 in the second direction (X-axis direction). For example, a bottom surface 1144as of the second operating support portion 1144a may be coupled to the second moving part 1143.

The second operating extension 1144b may be connected to the second operating support portion 1144a. The second operating extension 1144b may extend from a lower portion of the second operating support portion 1144a toward the first link part 1132. Alternatively, the second operating extension 1144b may extend from the lower portion of the second operating support portion 1144a toward a 1-1 driving part. In other words, the second operating extension 1144b may be positioned between the first link part 1132 and the second operating support portion 1144a. Therefore, it is possible to reduce a size of the camera actuator by arranging both the first operating part and the second operating part in a predetermined space.

The second seating portion 1144c may be connected to the second operating support portion 1144a, and may have an upper surface inclined at a fourth inclination Od with respect to the ZY plane. The second suction part 1145 may be seated on the second seating portion 1144c.

In the embodiment, the second seating portion 1144c may include a second seating groove 1144h. The second seating groove 1144h may also be inclined at the fourth inclination Od with respect to the ZY plane. The fourth inclination Od may correspond to the first inclination or the angle at which the rotation part is inclined with respect to the ZY plane. With this configuration, a suction force by the rotation part and the second suction part is uniformly provided, and thus the pitch tilt can be performed accurately.

The second pressing portion 1144d may be positioned adjacent to the second seating portion 1144c. In addition, the second pressing portion 1144d may come into contact with the second seating portion 1144c. The second pressing portion 1144d may be positioned between the second seating portion 1144c and the rotation part. Therefore, the second pressing portion 1144d may be positioned closer to the rotation part than the second seating portion 1144c. With this configuration, the second pressing portion 1144d may press the rotation part to be pitch-tilted. The second pressing portion 1144d may have a second contact surface 1144ds coming into contact with the rotation part. The second contact surface 1144ds may also be inclined at a fifth inclination θe with respect to the ZY plane. The fifth inclination θe may correspond to the fourth inclination Od. With this configuration, since the second pressing portion uniformly presses the rotation part, the pitch tilt can be performed accurately.

Furthermore, the second seating portion 1144c may suck the rotation part to be pitch-tilted through the second suction part 1145. In other words, the pitch tilt may be performed by the second pressing portion 1144d pressing the rotation part while moving in the third direction (Z-axis direction). In addition, even when the second pressing portion 1144d moves in the direction opposite to the third direction (Z-axis direction), the rotation part maintains the contact with the second pressing portion 1144d by the second suction part 1145, and thus the pitch tilt can be performed.

The second suction part 1145 may be seated in the second seating groove 1144h. The second suction part 1145 may be formed of a magnetic substance.

For example, the second suction part 1145 may be a magnet and may form an attractive force with the rotation part made of a metallic material. Therefore, even when the second pressing portion 1144d moves in the third direction (Z-axis direction), the contact between the rotation part and the second pressing portion 1144d is maintained by the second suction part 1145, and thus the pitch tilt of the rotation part can be performed.

FIG. 10 is a perspective view of a first board part and a position sensor part of the first camera actuator according to the embodiment.

Referring to FIG. 10, the first camera actuator according to the embodiment may include the first board part 1150 and the position sensor part 1160.

As described above, the first board part 1150 may be seated on the holder 1110. In addition, the first board part 1150 may be electrically connected to the first driving part to change lengths of the first piezoelectric part and the second piezoelectric part by the first driving part. In other words, an electrical signal (e.g., voltage) input through the first board part 1150 may expand the first piezoelectric part and the second piezoelectric part in the third direction (Z-axis direction).

In addition, the first board part 1150 may include a circuit board having a wiring pattern which may be electrically connected, such as a rigid printed circuit board (PCB), a flexible PCB, and a rigid flexible PCB. However, the present invention is not limited to these types.

The position sensor part 1160 may include a first Hall sensor 1161b, a second Hall sensor 1162b, a first magnet 1161a, and a second magnet 1162a.

In the embodiment, the first magnet 1161a may be coupled to the first operating part. More specifically, the first magnet 1161a may be positioned on the bottom surface 1134as of the first operating support portion 1134a of the first operating part. In addition, the second magnet 1162a may be coupled to the second operating part. More specifically, the second magnet 1162a may be positioned on the bottom surface 1144as of the second operating support portion 1144a of the second operating part.

In addition, the first Hall sensor 1161b and the second Hall sensor 1162b may be connected to the bracket 1120 or the additional board on the bracket.

Therefore, the first magnet 1161a may move in response to the movement of the first operating part in the third direction (Z-axis direction). In addition, the first Hall sensor 1161b may detect a change in magnetic force according to the movement of the first magnet 1161a.

In addition, the second magnet 1162a coming into contact with the second operating part may move in response to the movement of the second operating part in the third direction (Z-axis direction). In addition, the second Hall sensor 1162b may detect a change in magnetic force according to the movement of the second magnet 1162a.

The first magnet 1161a and the second magnet 11262a come into contact with the bottom surface 1134as of the first operating support portion 1134a and the bottom surface 1144as of the second operating support portion 1144a, respectively, and thus may be inclined at the predetermined angle described above.

FIG. 11 is a perspective view of the rotation part and the optical member of the first camera actuator according to the embodiment, FIG. 12 is a perspective view of the rotation part of the first camera actuator according to the embodiment, and FIG. 13 is a front view of the rotation part of the first camera actuator according to the embodiment.

Referring to FIGS. 11 to 13, the optical member 1180 may be seated on the rotation part 1170. As described above, the optical member 1180 may include a reflective member such as a prism or a mirror. In addition, the optical member 1180 may further include at least one lens in front or behind the reflective member.

In the embodiment, the rotation part 1170 may include a first rotation plate 1171, a second rotation plate 1172, a fixing plate 1173, a first bridge BR1, and a second bridge BR2.

The first rotation plate 1171 may be positioned at an innermost side of the rotation part 1170. The first rotation plate 1171 may support the optical member 1180. An area of the first rotation plate 1171 may be greater than or equal to that of the optical member 1180. With this configuration, the optical member 1180 may also easily rotate in response to the rotation of the first rotation plate.

The second rotation plate 1172 may be positioned outside the first rotation plate 1171. The second rotation plate 1172 may have an open inner side, and the first rotation plate 1171 may be positioned inside the second rotation plate 1172. For example, the second rotation plate 1172 may be in the form of a closed loop or an open loop.

The second rotation plate 1172 may cover the first rotation plate 1171. The second rotation plate 1172 may rotate independently of or dependent on the first rotation plate 1172. For example, only the first rotation plate 1171 may rotate (e.g., yaw-tilt). Alternatively, both the first rotation plate 1171 and the second rotation plate 1172 may rotate (e.g., pitch-tilt).

The first bridge BR1 may be positioned between the first rotation plate 1171 and the second rotation plate 1172. The first bridge BR1 may include a 1-1 bridge BR1a and a 1-2 bridge BR1b. The 1-1 bridge BR1a may be positioned at the top. In addition, the 1-2 bridge BR1b may be positioned at the bottom.

The 1-1 bridge BR1a and the 1-2 bridge BR1b may be positioned at points bisecting the pitch direction between the first rotation plate 1171 and the second rotation plate 1172. As described above, the yaw direction may be defined as one direction on the XZ plane when the rotation part is a plane. In addition, as described above, the pitch direction may be defined as one direction on the YZ plane when the rotation part is a plane.

In addition, the 1-1 bridge BR1a and the 1-2 bridge BR1b may overlap in the yaw direction. With this configuration, the first rotation plate 1171 positioned inside the 1-1 bridge BR1a and the 1-2 bridge BR1b can be accurately rotated (yaw-tilted).

The fixing plate 1173 may be positioned at an outermost side of the rotation part 1170. The fixing plate 1173 may be positioned on the inclined surface 1114a of the rotation support part 1114. Therefore, the fixing plate 1173 may be supported by the rotation support part 1114 and may not rotate.

The fixing plate 1173 may be coupled to the second rotation plate 1172 through the second bridge BR2 outside the first rotation plate 1171 and the second rotation plate 1172.

The second bridge BR2 may include a 2-1 bridge BR2a and a 2-2 bridge BR2b. The 2-1 bridge BR2a and the 2-2 bridge BR2b may overlap in the pitch direction. With this configuration, the first rotation plate 1171 and the second rotation plate 1172 positioned inside the 2-1 bridge BR2a and the 2-2 bridge BR2b can be accurately rotated (pitch-tilted).

The 2-1 bridge BR2a and the 2-2 bridge BR2b may be positioned in parallel with a first virtual line CV1 bisecting the rotation part in the pitch direction.

In addition, the 1-1 bridge BR1a and the 1-2 bridge BR1b may be positioned in parallel with a second virtual line CV2 bisecting the rotation part in the yaw direction.

In addition, the first virtual line CV1 may be parallel to the pitch direction, and the second virtual line CV2 may be parallel to the yaw direction.

In the embodiment, the first rotation plate 1171 may be yaw-tilted by the driving of the first driving part described above. At this time, contact points CP1 and CP2 of the first rotation plate 1171 and the first driving part may be positioned at edges of the first rotation plate 1171. With this configuration, the yaw tilt can be easily performed even with a small voltage. In other words, the first camera actuator can provide improved power efficiency.

The contact points CP1 and CP2 of the first rotation plate 1171 may be points or regions. For example, a point (e.g., the first point CP1) may be positioned on the first virtual line CV1 or on a bisector in a vertical direction of the first rotation plate 1171. In addition, a region (e.g., the first region CP2) may be symmetrically positioned on the first virtual line CV1. With this configuration, the rotation of the rotation part according to the pressing and suction forces is not concentrated on one side, and the rotation part can be accurately yaw-tilted.

In addition, the second rotation plate 1172 may be pitch-tilted together with the first rotation plate 1171 by driving of the second driving part. At this time, contact points CP3 and CP4 of the second rotation plate 1172 and the second driving part may be positioned at edges of the second rotation plate 1172. With this configuration, the pitch tilt can be easily performed.

The contact points CP3 and CP4 of the second rotation plate 1172 may be points or regions. For example, a point (e.g., the second point CP3) may be positioned on the second virtual line CV2 or on a bisector in a vertical direction of the second rotation plate 1172. In addition, a region (e.g., the second region CP4) may be symmetrically positioned on the second virtual line CV2. With this configuration, the rotation of the rotation part according to the pressing and suction forces is not concentrated on one side, and the rotation part can be accurately pitch-tilted.

FIG. 14 is a top perspective view of the first camera actuator according to the embodiment, and FIG. 15 is a front view of the first camera actuator according to the embodiment in which the rotation part and the optical member are removed.

Referring to FIGS. 14 and 15, in the first camera actuator according to the embodiment, the first rotation plate 1171 of the rotation part 1170 may be yaw-tilted by the first driving part 1130. At this time, the first link part, the first connecting part, the first operating part, and the first suction part of the first driving part 1130 may move in the third direction (Z-axis direction). The first link part, the first connecting part, the first operating part, and the first suction part may advance and retract in the third direction (Z-axis direction).

For example, the first link part, the first connecting part, and the first operating part may move in the third direction (Z-axis direction) (F1a) and press the rotation part (F1b). In addition, the first link part, the first connecting part, and the first operating part may maintain the contact with the rotation part by the suction force of the first suction part (F1c) while moving in a direction opposite to the third direction (Z-axis direction). Alternatively, a predetermined distance between the first suction part and the rotation part may be maintained.

In the first camera actuator according to the embodiment, the second rotation plate 1172 and the first rotation plate 1171 of the rotation part 1170 may be pitch-tilted by the second driving part 1140. At this time, the second link part, the second connecting part, the second operating part, and the second suction part of the second driving part 1140 may move in the third direction (Z-axis direction) (F2a). The second link part, the second connecting part, the second operating part, and the second suction part may advance and retract in the third direction (Z-axis direction).

For example, the second link part, the second connecting part, and the second operating part may move in the third direction (Z-axis direction) and press the rotation part. In addition, the second link part, the second connecting part, and the second operating part may maintain the contact with the rotation part by the suction force of the second suction part (F2c) while moving in the direction opposite to the third direction (Z-axis direction). Alternatively, a predetermined distance may be maintained.

In addition, the first Hall sensor 1161b may be positioned below the first magnet 1161a. When there is no movement, the first Hall sensor 1161b may be positioned to overlap the first magnet 1161a in the first direction (X-axis direction).

In addition, the second Hall sensor 1162b may be positioned below the second magnet 1162a. Likewise, when there is no movement, the second Hall sensor 1162b may be positioned to overlap the second magnet 1162a in the first direction (X-axis direction).

With this configuration, the first camera actuator according to the embodiment may accurately detect the positional movement of the first operating part and the second operating part.

FIGS. 16A and 16B are views for describing the forward movement by the first driving part of the first camera actuator according to the embodiment, and FIGS. 17A and 17B are views for describing the backward movement by the first driving part of the first camera actuator according to the embodiment.

The piezoelectric parts (corresponding to the first and second piezoelectric parts) may expand and contract according to an applied voltage. For example, the piezoelectric part may expand when an applied voltage increases (F1aa) (see FIG. 16B) and contract when the voltage decreases (F1ab) (see FIG. 17B).

Referring to FIGS. 16A and 16B, the expansion and contraction of the piezoelectric part may be adjusted according to a first driving signal PS1, and the positions of the moving parts (corresponding to the first and second moving parts) may be changed on the link parts (corresponding to the first and second link parts).

For example, when a voltage is applied for a predetermined time (t0 to t1) and the pressing portion and the link part advance at a predetermined speed or lower, the moving part may have the same position on the link part. In other words, a distance d1 between the moving part and the pressing portion may be maintained.

However, when a voltage is applied for a predetermined time (t1 to t2) and the pressing portion and the link part retract at a higher speed than the predetermined speed, the position of the moving part may be changed on the link part. The total voltage ST2 applied for the time (t1 to t2) may be equal to the total voltage ST1 applied for the time (t0 to t1). For example, a magnitude of the voltage may be greater for the time (t1 to t2) than for the time (t0 to t1). This may be changed depending on the piezoelectric part. Hereinafter, when a positive (+) voltage is applied to the piezoelectric part, a length of the piezoelectric part expands in the third direction (Z-axis direction), and when a negative (−) voltage is applied to the piezoelectric part, the length of the piezoelectric part contracts in the third direction (Z-axis direction).

Therefore, the position of the moving part may be maintained by inertia, and thus the relative position of the moving part on the link part may be the same as the expansion direction. In other words, the distance between the moving part and the pressing portion may increase (increase from d1 to d2). In other words, finally, even though the length of the piezoelectric part is the same by applying the first driving signal PS1, the position between the piezoelectric part and the moving part increases, and thus the operating part and the suction part may move in the third direction.

This first driving signal PS1 may be repeated several times for a predetermined time. For example, the first driving signal may be repeatedly applied to the piezoelectric part 100 times per second. Therefore, the first driving signal of one cycle may allow the first moving part to move in the third direction to press the rotation part and perform the yaw tilt.

Referring to FIGS. 17A and 17B, the expansion and contraction of the piezoelectric part may be adjusted according to a second driving signal PS1′, and the positions of the moving parts (corresponding to the first and second moving parts) may be changed on the link parts (corresponding to the first and second link parts).

For example, when a voltage is applied for a predetermined time (t0' to t1') and the pressing portion and the link part retract at a predetermined speed or lower, the moving part may have the same position on the link part. In other words, a distance d3 between the moving part and the pressing portion may be maintained.

However, when a voltage is applied for a predetermined time (t1' to t2') and the pressing portion and the link part advance at a higher speed than the predetermined speed, the position of the moving part may be changed on the link part. The total voltage ST2' applied for the time (t1' to t2') may be equal to the total voltage ST1' applied for the time (t0' to t1'). For example, a magnitude of the voltage may be greater for the time (t1' to t2') than for the time (t0' to t1'). This may be changed depending on the piezoelectric part as described above.

Therefore, the position of the moving part may be maintained by inertia, and thus the relative position of the moving part on the link part may be the same as the expansion direction. In other words, a distance between the moving part and the pressing portion may be decreased (decreased from d3 to d4). In other words, finally, even when the length of the piezoelectric part is the same by applying the second driving signal PS1', the position between the piezoelectric part and the moving part decreases, and thus the moving part and the suction part may move in the direction opposite to the third direction.

The second driving signal PS1' may be repeated several times for a predetermined time. For example, the second driving signal may be repeatedly applied to the piezoelectric part 100 times per second. Therefore, the second driving signal of one cycle may allow the first moving part to move in the third direction to press the rotation part and perform the yaw tilt.

FIG. 18 is a perspective view of a second camera actuator according to the embodiment, FIG. 19 is an exploded perspective view of the second camera actuator according to the embodiment, FIG. 20 is a cross-sectional view along line D-D' in FIG. 18, and FIG. 21 is a cross-sectional view along line E-E' in FIG. 18. Referring to FIGS. 18 to 21, the second camera actuator 1200 according to the embodiment may include a lens part 1220, a second housing 1230, a third driving part 1250, a base part (not shown), and a second board part 1270. Furthermore, the second camera actuator 1200 may further include a second shield can (not shown), an elastic part (not shown), and a bonding member (not shown). Furthermore, the second camera actuator 1200 according to the embodiment may further include an image sensor IS.

The second shield can (not shown) may be positioned in one region (e.g., an outermost side) of the second camera actuator 1200 and positioned to surround components (the lens part 1220, the second housing 1230, the elastic part (not shown), the third driving part 1250, the base part (not shown), the second board part 1270, and the image sensor IS) to be described below.

The second shield can (not shown) may block or reduce electromagnetic waves generated from the outside. Therefore, it is possible to reduce the occurrence of a malfunction in the third driving part 1250.

The lens part 1220 may be positioned in the second shield can (not shown). The lens part 1220 may move in the third direction (Z-axis direction). Therefore, the above-described AF function may be performed.

Specifically, the lens part 1220 may include a lens assembly 1221 and a bobbin 1222.

The lens assembly 1221 may include at least one lens. In addition, a plurality of lens assemblies 1221 may be provided, but hereinafter, the description will be based on one lens assembly.

The lens assembly 1221 may be coupled to the bobbin 1222 to move in the third direction (Z-axis direction) by electromagnetic forces generated from a third magnet 1252a and a second magnet 1252b coupled to the bobbin 1222.

The bobbin 1222 may include an opening region surrounding the lens assembly 1221. In addition, the bobbin 1222 may be coupled to the lens assembly 1221 by various methods. In addition, the bobbin 1222 may include a groove in a side surface thereof and may be coupled to the third magnet 1252a and the second magnet 1252b through the groove. A bonding member or the like may be applied to the groove.

In addition, the bobbin 1222 may be coupled to an elastic part (not shown) at an upper end and a rear end thereof. Therefore, the bobbin 1222 may be supported by the elastic part (not shown) to move in the third direction (Z-axis direction). In other words, a position of the bobbin 1222 may be maintained while being maintained in the third direction (Z-axis direction). The elastic part (not shown) may be formed of a leaf spring.

The second housing 1230 may be disposed between the lens part 1220 and the second shield can (not shown). In addition, the second housing 1230 may be disposed to surround the lens part 1220.

A hole may be formed in a side portion of the second housing 1230. A first coil 1251a and a second coil 1251b may be disposed in the hole. The hole may be positioned to correspond to the groove of the bobbin 1222 described above. Alternatively, the first coil and the second coil may be referred to as a "third coil" and a "fourth coil" to correspond to the magnets.

The third magnet 1252a may be positioned to face the first coil 1251a. In addition, the second magnet 1252b may be positioned to face the second coil 1251b.

The elastic part (not shown) may include a first elastic member (not shown) and a second elastic member (not shown). The first elastic member (not shown) may be coupled to the upper surface of the bobbin 1222. The second elastic member (not shown) may be coupled to a lower surface of the bobbin 1222. In addition, the first elastic member (not shown) and the second elastic member (not shown) may be formed of a leaf spring as described above. In addition, the first elastic member (not shown) and the second elastic member (not shown) may provide elasticity with respect to the movement of the bobbin 1222.

The third driving part 1250 may provide driving forces F3 and F4 for moving the lens part 1220 in the third direction (Z-axis direction). The third driving part 1250 may include a driving coil 1251 and a driving magnet 1252.

The lens part 1220 may move in the third direction (Z-axis direction) by the electromagnetic force formed between the driving coil 1251 and the driving magnet 1252.

The driving coil 1251 may include the first coil 1251a and the second coil 1251b. The first coil 1251a and the second coil 1251b may be disposed in the hole formed in the side portion of the second housing 1230. In addition, the first coil 1251a and the second coil 1251b may be electrically connected to the second board part 1270. Therefore, the first coil 1251a and the second coil 1251b may receive a current or the like through the second board part 1270.

The driving magnet 1252 may include the third magnet 1252a and the fourth magnet 1252b. The third magnet 1252a and the fourth magnet 1252b may be disposed in the above-described groove of the bobbin 1222 and positioned to correspond to the first coil 1251a and the second coil 1251b.

The base part (not shown) may be positioned between the lens part 1220 and the image sensor IS. A component such as a filter may be fixed to the base part (not shown). In addition, the base part (not shown) may be disposed to surround the image sensor IS. With this configuration, since the image sensor IS is free from foreign substances, it is possible to improve the reliability of the device.

In addition, the second camera actuator may be a zoom actuator or an AF actuator. For example, the second camera actuator may support one lens or a plurality of lenses and perform an auto-focusing function or a zooming function by moving the lenses according to a predetermined control signal of a controller.

In addition, the second camera actuator may be a fixed zoom actuator or a continuous zoom actuator. For example, the second camera actuator may provide the movement of the lens assembly 1221.

In addition, the second camera actuator may be formed of a plurality of lens assemblies. For example, the second camera actuator may include at least one of a first lens assembly (not shown), a second lens assembly (not shown), a third lens assembly (not shown), and a guide pin (not shown). The above description may be applied thereto. Therefore, the second camera actuator may perform a high-magnification zooming function through the driving part. For example, the first lens assembly (not shown) and the second lens assembly (not shown) may be a moving lens that moves through the driving part and the guide pin (not shown), and the third lens assembly (not shown) may be a fixed lens, but the present invention is not limited thereto. For example, the third lens assembly (not shown) may perform a function of a focator for imaging light at a specific position, and the first lens assembly (not shown) may function as a variator for re-forming an image formed by the third lens assembly, which is the focator, at another position. Meanwhile, the first lens assembly may be in a state in which a magnification change is large because a distance to a subject or an image distance is greatly changed, and the first lens assembly, which is the variator, may play an important role in the focal length or magnification change of the optical system. Meanwhile, imaging points of an image formed by the first lens assembly, which is the variator, may be slightly different depending on a position. Therefore, the second lens assembly may perform a position compensation function for the image formed by the variator. For example, the second lens assembly may perform a function of a compensator for accurately forming an image at an actual position of the image sensor using the imaging points of the image formed by the first lens assembly which is the variator.

The image sensor IS may be positioned inside or outside the second camera actuator. In the embodiment, as shown, the image sensor IS may be positioned inside the second camera actuator. The image sensor IS may receive light and convert the received light into an electrical signal. In addition, the image sensor IS may have a plurality of pixels in the form of an array. In addition, the image sensor IS may be positioned on the optical axis.

FIG. 22 is a perspective view of a mobile terminal to which a camera module according to the embodiment is applied.

Referring to FIG. 22, a mobile terminal 1500 in the embodiment may include a camera module 1000, a flash module 1530, and an AF device 1510 provided on a rear surface thereof.

The camera module 1000 may include an image capturing function and an AF function. For example, the camera module 1000 may include the AF function using an image.

The camera module 1000 processes an image frame of a still image or a moving image obtained by an image sensor in a capturing mode or a video call mode.

The processed image frame may be displayed on a predetermined display part and stored in a memory. A camera (not shown) may also be disposed on a front surface of a body of the mobile terminal.

For example, the camera module 1000 may include a first camera module and a second camera module, and OIS may be implemented together with the AF or zoom function by the first camera module.

The flash module 1530 may include a light emitting device for emitting light therein. The flash module 1530 may be operated by a camera operation of the mobile terminal or a user's control.

The AF device 1510 may include one of packages of a surface light emitting laser device as a light emitting part.

The AF device 1510 may include the AF function using a laser. The AF device 1510 may be mainly used in a condition in which the AF function using the image of the camera module 1000 is degraded, for example, in an environment in which a subject is close to 10 m or less or in a dark environment.

The AF device 1510 may include a light emitting part including a vertical cavity surface emitting laser (VCSEL) semiconductor device and a light receiving part for converting light energy into electrical energy, such as a photodiode.

FIG. 23 is a perspective view of a vehicle to which the camera module according to the embodiment is applied.

For example, FIG. 23 is an external view of the vehicle including a vehicle driver assistance device to which the camera module 1000 according to the embodiment is applied.

Referring to FIG. 23, a vehicle 700 in the embodiment may include wheels 13FL and 13FR rotated by a power source and a predetermined sensor. The sensor may be a camera sensor 2000, but the present invention is not limited thereto.

The camera 2000 may be a camera sensor to which the camera module 1000 according to the embodiment is applied. The vehicle 700 in the embodiment may acquire image information through the camera sensor 2000 for capturing a front image or a surrounding image, determine a situation in which a lane line is not identified using the image information, and generate a virtual lane line when the lane line is not identified.

For example, the camera sensor 2000 may acquire a front image by capturing a view in front of the vehicle 700, and a processor (not shown) may acquire image information by analyzing an object included in the front image.

For example, when objects, such as a median, a curb, or a street tree corresponding to a lane line, an adjacent vehicle, a traveling obstacle, and an indirect road mark, are captured in the image captured by the camera sensor 2000, the processor may detect the object and include the detected object in the image information. At this time, the processor may further supplement the image information by acquiring distance information to the object detected through the camera sensor 2000.

The image information may be information on the object captured in the image. The camera sensor 2000 may include an image sensor and an image processing module.

The camera sensor 2000 may process a still image or a moving image obtained by the image sensor (e.g., a complementary metal-oxide semiconductor (CMOS) or a charge-coupled device (CCD)).

The image processing module may process the still image or moving image acquired through the image sensor to extract necessary information, and transmit the extracted information to the processor.

At this time, the camera sensor 2000 may include a stereo camera for improving the measurement accuracy of the object and further securing information such as a distance between the vehicle 700 and the object, but the present invention is not limited thereto.

Although embodiments have been mainly described above, these are only illustrative and do not limit the present invention, and those skilled in the art to which the present invention pertains will understand that various modifications and applications not exemplified above are possible without departing from the essential characteristics of the embodiments. For example, each component specifically shown in the embodiments may be implemented by modification. In addition, differences related to these modifications and applications should be construed as being included in the scope of the present invention defined in the appended claims.

The invention claimed is:

1. A camera actuator comprising:
   a holder disposed on a lower portion;
   a rotation part disposed in the holder;
   an optical member disposed on the rotation part; and
   a first driving part configured to tilt the optical member along a first axis and a second driving part configured to tilt the optical member along a second axis by pressing the rotation part,
   wherein the rotation part includes:
   a first rotation plate disposed therein;
   a second rotation plate disposed outside the first rotation plate;
   a fixing plate disposed outside the second rotation plate;
   a first bridge positioned between the first rotation plate and the second rotation plate and corresponding to the first axis; and
   a second bridge positioned between the second rotation plate and the fixing plate and corresponding to the second axis.

2. The camera actuator of claim 1, wherein the first bridge is positioned on a virtual line bisecting the first rotation plate along the second axis.

3. The camera actuator of claim 2, wherein the second bridge is positioned on a virtual line bisecting the second rotation plate along the first axis.

4. The camera actuator of claim 1, wherein the first driving part includes:
   a first piezoelectric part configured to expand and contract in an optical axis direction;
   a first link part connected to the first piezoelectric part;
   a first moving part connected to the first link part;
   a first operating part connected to the first moving part and coming into contact with the first rotation plate; and
   a first suction part disposed adjacent to the first rotation plate and configured to pull the first rotation plate.

5. The camera actuator of claim 4, wherein the second driving part includes:
   a second piezoelectric part configured to expand and contract in the optical axis direction;
   a second link part connected to the second piezoelectric part;
   a second moving part connected to the second link part;
   a second operating part connected to the second moving part and coming into contact with the second rotation plate; and
   a second suction part disposed adjacent to the second rotation plate and configured to pull the second rotation plate.

6. The camera actuator of claim 5, wherein the first link part and the first moving part move in response to mechanical deformation of the first piezoelectric part,
   the second link part and the second moving part move in response to mechanical deformation of the second piezoelectric part,
   a position of the first moving part is changed with respect to the first link part when the first link part moves at a predetermined speed or higher, and
   a position of the second moving part is changed with respect to the second link part when the second link part moves at a predetermined speed or higher.

7. The camera actuator of claim 6, further comprising a bracket disposed in the holder.

8. The camera actuator of claim 7, wherein the bracket includes:
   a bracket support part disposed on the holder;
   a first protrusion and a second protrusion positioned on the bracket support part; and
   a third protrusion disposed to be spaced apart from the first protrusion and the second protrusion in the optical axis direction.

9. The camera actuator of claim 8, wherein the first protrusion includes a first hole,
   the second protrusion includes a second hole,
   the third protrusion includes a third hole and a fourth hole,
   the first hole overlaps the third hole in the optical axis direction, and
   the second hole overlaps the fourth hole in the optical axis direction.

10. The camera actuator of claim 9, wherein the first link part passes through the second hole and the fourth hole, and
    the second link part passes through the first hole and the third hole.

* * * * *